US010611379B2

United States Patent
Olabiyi et al.

(10) Patent No.: US 10,611,379 B2
(45) Date of Patent: Apr. 7, 2020

(54) INTEGRATIVE COGNITION OF DRIVER BEHAVIOR

(71) Applicant: TOYOTA JIDOSHA KABUSHIKI KAISHA, Toyota-shi, Aichi-ken (JP)

(72) Inventors: Oluwatobi Olabiyi, Mountain View, CA (US); Veeraganesh Yalla, Mountain View, CA (US); Eric Martinson, Sunnyvale, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 863 days.

(21) Appl. No.: 15/238,646

(22) Filed: Aug. 16, 2016

(65) Prior Publication Data

US 2018/0053093 A1 Feb. 22, 2018

(51) Int. Cl.
*G06F 15/18* (2006.01)
*B60W 40/09* (2012.01)
*G01C 21/36* (2006.01)
*G06N 3/08* (2006.01)
*G06N 3/04* (2006.01)
*G06N 7/00* (2006.01)

(52) U.S. Cl.
CPC ......... *B60W 40/09* (2013.01); *G01C 21/3697* (2013.01); *G06N 3/049* (2013.01); *G06N 3/0454* (2013.01); *G06N 3/084* (2013.01); *G06N 3/0445* (2013.01); *G06N 3/0472* (2013.01); *G06N 7/005* (2013.01)

(58) Field of Classification Search
CPC ........................................................ G06F 3/00
USPC ...................................... 706/15, 45
See application file for complete search history.

(56) References Cited

U.S. PATENT DOCUMENTS

| 10,366,158 | B2* | 7/2019 | Bellegarda | G06F 17/276 |
| 2011/0081634 | A1 | 4/2011 | Kurata et al. | |
| 2014/0236386 | A1 | 8/2014 | Yoshizawa et al. | |
| 2018/0053093 | A1* | 2/2018 | Olabiyi | G06N 3/0454 |

FOREIGN PATENT DOCUMENTS

| JP | 2009-234442 | 10/2009 |
| JP | 2011-53798 | 3/2011 |
| JP | 2011-81431 | 4/2011 |

(Continued)

OTHER PUBLICATIONS

Radoslaw et al, Deep Neural Networks predict Hierarchical Spatio-temporal Cortical Dynamics of Human Visual Object Recognition, 2016, MIT, pp. 1-15 (Year: 2016).*

(Continued)

*Primary Examiner* — David R Vincent
(74) *Attorney, Agent, or Firm* — Patent Law Works LLP

(57) ABSTRACT

By way of example, the technology disclosed by this document is capable of receiving signal data from one or more sensors; inputting the signal data into an input layer of a deep neural network (DNN), the DNN including one or more layers; generating, using the one or more layers of the DNN, one or more spatial representations of the signal data; generating, using one or more hierarchical temporal memories (HTMs) respectively associated with the one or more layers of the DNNs, one or more temporal predictions by the DNN based on the one or more spatial representations; and generating an anticipation of a future outcome by recognizing a temporal pattern based on the one or more temporal predictions.

31 Claims, 17 Drawing Sheets

(56) References Cited

FOREIGN PATENT DOCUMENTS

| JP | 2016-119792 | 6/2016 |
|----|-------------|--------|
| WO | 2013/042260 | 3/2013 |

OTHER PUBLICATIONS

Dong et al., "Characterizing Driving Styles with Deep Learning," Oct. 2016, arXiv:1607.03611v1 [cs.ai], pp. 1-6.

Morris et al., "Lane Change Intent Prediction for Driver Assistance: On-Road Design and Evaluation," 2011 IEEE Intelligent Vehicles Symposium (IV), Baden-Baden, Germany, Jun. 5-9, 2011, pp. 895-901.

Puskorius et al., "Truncated Backpropagation Through Time and Kalman Filter Training for Neurocontrol," Proceedings of the 1994 IEEE International Conference on Neural Networks, Jun. 28-Jul. 2, 1994, pp. 2488-2493.

Wöllmer et al., "Online Driver Distraction Detection Using Long Short-Term Memory," IEEE Transactions on Intelligent Transportation Systems, vol. 12, No. 2, Jun. 2011, pp. 574-582.

He et al., "Driving intention recognition and behaviour prediction based on a double-layer hidden Markov model," Journal of Zhejiang University Science, 2012 (10 pages).

Jain et al., "Car that Knows Before You Do: Anticipating Maneuvers Via Learning Temporal Driving Models," Proceedings of the IEEE International Conference on Computer Vision, 2015 (9 pages).

Jain et al., "Recurrent Neural Networks for Driver Activity Anticipation via Sensory-Fusion Architecture," IEEE International Conference on Robotics and Automation, 2016 (8 pages).

Wikipedia, "Hierarchical temporal memory," retrieved Mar. 25, 2016, from https://en.wikipedia.org/wiki/Hierarchical_temporal_memory (9 pages).

Wikipedia, "Backpropagation," retrieved Mar. 25, 2016, from https://en.wikipedia.org/wiki/Backpropagation (9 pages).

* cited by examiner

INTEGRATIVE COGNITION OF DRIVER BEHAVIOR

BACKGROUND

The present disclosure relates to machine learning.

Traffic accidents kill over 1.2 million people a year worldwide, and more than 30,000 people die in US alone annually according to the reports from World Health Organization's global status report on road safety and National Highway Traffic Safety Administration. Many of the accidents are caused by the risky driving behaviors, which could be preventable if these behaviors could be predicted and drivers warned, and/or compensation strategies generated in advance, even just a few seconds. Generally, current state-of-the-art Advanced Driver Assistance System (ADAS) solutions are unable to provide high-precision driver behavior prediction in a cost-effective manner due to the limitations in their systems/models.

Some existing approaches attempt to predict driver behavior using only limited data related to driving. For instance, He L., Zong C., and Wang C., "Driving intention recognition and behavior prediction based on a double-layer hidden Markov model," *Journal of Zhejiang University-SCIENCE C (Computers & Electronics)*, Vol. 13 No 3, 2012, 208-217, describes a double layer Hidden Markov Model (HMM) that includes a lower layer multi-dimensional Gaussian HMM performing activity recognition and an upper layer multi-dimensional discrete HMM performing anticipation. However, this model only considers Controlled Area Network (CAN) data such as breaking, accelerating, and steering, and fails to account for important features that affect driving, such as road conditions, location familiarity and steering pattern of a driver.

Some approaches require feature extraction before driver behavior recognition and prediction. For instance, Jain, A., Koppula S., Raghavan B., Soh S., and Saxena A., "Car that knows before you do: anticipating maneuvers via learning temporal driving models," *ICCV*, 2015, 3182-3190, considers an elaborate multi-sensory domain for predicting a driver's activity using a Auto-regressive Input-Output HMM (AIO-HMM). In a first step, Jain describes extracting features from input signal data, such as high-level features from a driver-facing camera to detect a driver's head pose, object features from a road-facing camera to determine a road occupancy status, etc. However, Jain's approach requires a substantial amount of human involvement, which makes it impractical for dynamic systems and possibly dangerous. Further, the number of sensory inputs considered by Jain is not representative of typical human driving experiences, and the model is unable to consider important features affecting driver's action, such as steering patterns, local familiarity, etc.

Some approaches, such as Jain A., Koppula S., Raghavan B., Soh S., and Saxena A., "Recurrent neural networks for driver activity anticipation via sensory-fusion architecture," *arXiv*:1509.05016v1 [cs.CV], 2015, describe using a generic model developed with data from a population of drivers. However, a model like Jain's is unable to adequately model and predict driver behavior and thus reduce the risk of an accident from occurring. In particular, Jain's model is based on a Long-Short Time Memory Recursive Neural Network (LSTM-RNN), and is trained using a backpropagation through time (BPTT) algorithm. However, training this model can be computationally expensive, and memory limitation of the BPTT algorithm can limit the maximum achievable horizon for driver behavior prediction. The model further suffers from a precision vs. recall tradeoff. Moreover, since the model only tries to minimize the anticipation error over the horizon, it offers reduced flexibility on design and embodiment choices.

SUMMARY

The specification overcomes the deficiencies and limitations of the approaches described in the background section at least in part by providing novel technology for integrative cognition of driver behavior using a deep neuron network and associated hierarchical temporal memory.

According to one innovative aspect of the subject matter described in this disclosure, a method may include receiving, at one or more computing devices, signal data from one or more sensors, the one or more computing devices being electronically communicatively coupled to the one or more sensors to receive the signal data; inputting the signal data into an input layer of a deep neural network (DNN), the DNN including one or more layers; generating, using the one or more layers of the DNN, one or more spatial representations of the signal data; generating, using one or more hierarchical temporal memories (HTMs) respectively associated with the one or more layers of the DNNs, one or more temporal predictions by the DNN based on the one or more spatial representations; and generating an anticipation of a future outcome by recognizing a temporal pattern based on the one or more temporal predictions.

According to another innovative aspect of the subject matter described in this disclose, the system includes one or more sensors providing sensor data; one or more non-transitory computer memories for storing and providing access to data; one or more computer processors coupled to the non-transitory computer memories to store and receive data; a deep neural network (DNN) storable by the one or more non-transitory computer memories and executable by the one or more computer processors, the DNN including a plurality of hierarchical layers, the plurality of hierarchical layers including an input layer, one or more intermediate layers, and a recognition layer, the input layer of the DNN receiving sensor data from the one or more sensors; and a deep neural network (DNN) storable by the one or more non-transitory computer memories and executable by the one or more computer processors, the DNN including a plurality of hierarchical layers, the plurality of hierarchical layers including an input layer, one or more intermediate layers, and a recognition layer, the input layer of the DNN receiving sensor data from the one or more sensors. The plurality of hierarchical temporal memories (HTMs) are storable by the one or more non-transitory computer memories and executable by the one or more computer processors. The HTMs include an input layer HTM, one or more intermediate layer HTMs, and a recognition layer HTM. The input layer HTM is coupled to the input layer of the DNN and executable by the one or more computer processors to receive a spatial representation of the signal data. The input layer HTM is executable by the one or more computer processors to generate an input layer temporal prediction using the spatial representation of the signal data. The one or more intermediate layer HTMs are coupled to the one or more intermediate layers of the DNN and executable by the one or more computer processors to receive one or more intermediate layer spatial representations from the one or more intermediate layers of the DNN. The one or more intermediate layer HTMs are executable by the one or more computer processors to generate one or more intermediate layer temporal predictions based on the one or more intermediate layer spatial representations. The recognition layer HTM being coupled to the recognition layer of the DNN and executable by the one or more computer processors to receive a recognition layer spatial representation from the recognition layer of the DNN. The recognition layer HTM is executable by the one or more computer processors to generate a recognition layer temporal prediction based on the recognition layer spatial representation. The recognition layer HTM is executable by the one or more computer processors to generate an anticipation of a future outcome by recognizing a temporal pattern based on the input layer temporal prediction, the one or more intermediate layer temporal predictions, and the recognition layer temporal prediction.

Other aspects include corresponding methods, systems, apparatus, and computer programs, configured to perform various actions and/or store various data described in association with these aspects. These and other aspects, such as various data structures, may be encoded on tangible computer storage devices. For instance, one or more of these aspects may include one or more of the following: that recognizing the temporal pattern includes fusing the one or more temporal predictions; the DNN includes a plurality of hierarchical layers including an input layer and one or more intermediate layers, the input layer is coupled to an input layer HTM, the one or more intermediate layers are coupled to one or more intermediate layer HTMs, that generating the one or more spatial representations of the signal data and generating the one or more temporal predictions based on the one or more spatial representations further includes generating, by the input layer of the DNN, a first spatial representation of the signal data, generating, by the input layer HTM, a first temporal prediction using the first spatial representation of the signal data, receiving, by the one or more intermediate layers of the DNN, the first temporal prediction and the first spatial representation of the signal data, generating, by the one or more intermediate layers of the DNN, one or more intermediate spatial representations of the signal data, generating, by the one or more intermediate layer HTMs, one or more intermediate temporal predictions based on the one or more intermediate spatial representations of the signal data, and recognizing the temporal pattern includes fusing the first temporal prediction and the one or more intermediate temporal predictions; that the one or more intermediate layers of the DNN are hidden layers; that the DNN includes a recognition layer coupled to a recognition layer HTM, and fusing the first temporal prediction and the one or more intermediate temporal predictions includes fusing, at each HTM of the one or more intermediate layer HTMs and at the recognition layer, a current temporal prediction generated by the HTM and one or more prior temporal predictions generated by one or more prior intermediate layer HTMs and the input layer HTM; that generating, using the one or more layers of the DNN, the one or more spatial representations of the signal data includes performing, by a successive layer of the DNN, a nonlinear transformation of each spatial representation generated by one or more prior layers of the DNN; recognizing a spatial pattern correlated with a present outcome based on the one or more spatial representations; that the present outcome is a present human user action; that the signal data includes data describing characteristics of a vehicle in motion at a present time; that the future outcome is a predicted future human user action; computing, at a future time, an HTM prediction error for using 1) the one or more temporal predictions, and 2) one or more spatial representations of sensor data received at the future time; training the HTM based on the HTM prediction error; computing, at a future time, a DNN prediction error for a recognition layer of the DNN using 1) the anticipation, and 2) a recognized spatial pattern recognized by the recognition layer of the DNN based on the one or more spatial representations of sensor data received at a future time; training the DNN based on the DNN prediction error; that the signal data includes one or more of image data, audio data, vehicle data from a Controlled Area Network (CAN) of the vehicle, electronic messaging data, and navigation data associated with a moving platform; generating and providing one or more of an auditory instruction, a visual instruction, and a tactile instruction to the user via one or more output devices of a moving platform based on the anticipation of the outcome; and that receiving, at the one or more computing devices, the signal data from the one or more sensors includes receiving, at the one or more computing devices, two or more sets of signal data from two or more sets of sensors, respectively, the DNN includes two or more input layers, the two or more input layers being associated with two or more input layer HTMs, respectively, the one or more intermediate layers include two or more first intermediate layers associated with the two or more input layers, respectively, and a second intermediate layer after the two or more first intermediate layers, the one or more intermediate layer HTMs include two or more intermediate layer HTMs coupled to the two or more first intermediate layers of the DNN, generating, by the input layer of the DNN, a first spatial representation of the signal data includes generating, by the two or more input layers of the DNN, two or more first spatial representations of the signal data, generating, by the input layer HTM, a first temporal prediction using the first spatial representation of the signal data includes generating, by the two or more input layer HTMs, two or more first temporal predictions, generating, by the one or more intermediate layers of the DNN, one or more intermediate spatial representations of the signal data includes fusing the two or more first intermediate spatial representations, generating, by the one or more intermediate layer HTMs, one or more intermediate temporal predictions based on the one or more intermediate spatial representations of the signal data includes fusing the two or more first temporal predictions, and recognizing the temporal pattern includes fusing a present temporal prediction with the fused two or more first temporal predictions.

Numerous additional features may be included in these and various other embodiments, as discussed throughout this disclosure.

The novel technology provides an efficient and accurate framework for high precision anticipation of driver action over a future horizon using information from sensor inputs, and is particularly advantageous in a number of respects. The technology described herein can consider multiple types of input signal data, such as images, audios, texting, GPS (Global Positioning System), and CAN data. The modeling performed by the technology can forecast a driver's action, and can incorporate previously unconsidered features, such as steering patterns, location familiarity of the driver, etc. Additionally, the modeling performed by the technology can be continually trained for individual drivers and the forecasting can be adapted to individual drivers. Other non-limited advantages include the minimal pre-processing time, allowing maximum achievable anticipation horizon, improving system precision without necessarily sacrificing the recall, flexibility in design and embodiment, etc.

Further, the technology can realize both semantic and episodic types of memory other existing solutions are unable to provide. This allows the technology to recall past events and consider past driving experiences without requiring additional storage capacity to store historic data, which can reduce memory storage requirements.

The disclosure is illustrated by way of example, and not by way of limitation in the figures of the accompanying drawings in which like reference numerals are used to refer to similar elements.

DESCRIPTION

The integrative cognition technology described herein may efficiently and effectively model a driver's behavior based on the sensor data capturing the internal and external environments of a moving platform. For example, the integrative cognition technology processes information relating to driving, such as data describing a driver's driving habits and familiarity with driving environments, models the processed information, and generates precise driving predictions based on the modeling. In some embodiments, the modeling may be based on recognizing spatial and temporal patterns, as discussed further below.

In some embodiments, the integrative cognition technology includes an integrative cognition engine 105 (e.g., see FIG. 2B) configured to model driver behavior by recognizing spatial and temporal correlations learned from previous driving experiences. The computer-implemented algorithms used by the integrative cognition technology may predict driver action based on a single input modality or multiple modalities. A modality is associated with a signal source. A signal source may comprise one or more sensor(s) 103. For instance, video data may be received from a controller associated with the one or more sensor(s) 103 that processes data collected from a microphone and/or an image sensor into the video data. Signal data and sensor 103 types are discussed in further detail below.

While the embodiments described here are often related to the driving of a vehicle, the technology described herein may be applied to other suitable areas, such as machine operation, train operation, locomotive operation, plane operation, forklift operation, watercraft operation, or operation of any other suitable platforms.

Figure 1:
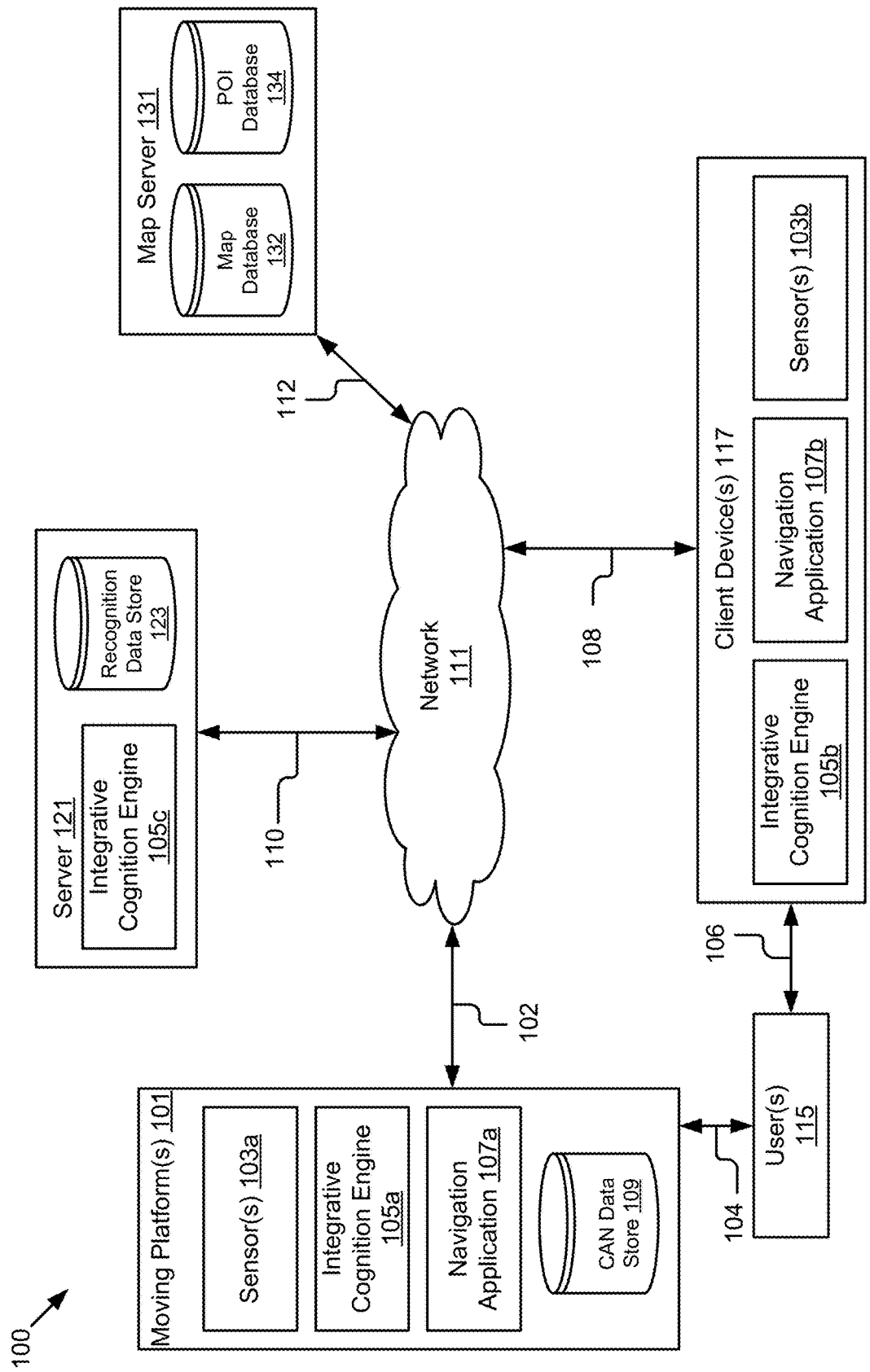
FIG. 1 is a block diagram of an example system for modeling driver behavior.

FIG. 1 is a block diagram of an example system 100 for modeling driver behavior. As illustrated, the system 100 includes a modeling server 121, a map server 131, client device(s) 117, and moving platform(s) 101. The entities of the system 100 are communicatively coupled via a network 111. It should be understood that the system 100 depicted in FIG. 1 is provided by way of example and the system 100 and/or further systems contemplated by this disclosure may include additional and/or fewer components, may combine components and/or divide one or more of the components into additional components, etc. For example, the system 100 may include any number of moving platforms 101, client devices 117, modeling servers 121, or map servers 131. For instance, additionally or alternatively, the system 100 may include a speech server for receiving and processing speech commands from a user 115, a search server for providing search results matching search queries, etc.

The network 111 may be a conventional type, wired and/or wireless, and may have numerous different configurations including a star configuration, token ring configuration, or other configurations. For instance, the network 111 may include one or more local area networks (LAN), wide area networks (WAN) (e.g., the Internet), public networks, private networks, virtual networks, peer-to-peer networks, and/or other interconnected data paths across which multiple devices may communicate.

The network 111 may also be coupled to or include portions of a telecommunications network for sending data in a variety of different communication protocols. In some embodiments, the network 111 includes Bluetooth® communication networks or a cellular communications network for sending and receiving data including via short messaging service (SMS), multimedia messaging service (MMS), hypertext transfer protocol (HTTP), direct data connection, WAP, email, etc. In some embodiments, the network 111 is a wireless network using a connection such as DSRC, WAVE, 802.11p, a 3G, 4G, 5G+ network, WiFi™, or any other wireless networks. Although FIG. 1 illustrates a single block for the network 111 that couples the modeling server 121, the map server 131, the client device(s) 117, and the moving platform(s) 101, it should be understood that the network 111 may in practice comprise any number of combination of networks, as noted above.

The modeling server 121 may include a hardware and/or virtual server that includes processor(s), memory(ies), and network communication capabilities (e.g., communication unit(s)). The modeling server 121 may be communicatively coupled to the network 111, as reflected by signal line 110. In some embodiments, the modeling server 121 may send and receive data to and from one or more of the map server 131, the client device(s) 117, and the moving platform(s) 101. In some embodiments, the modeling server 121 may include an instance of the integrative cognition engine 105c and a recognition data store 123, as discussed further elsewhere herein.

The recognition data store 123 may store terminology data for describing user's action. In FIG. 1, the modeling server 121 is shown as including the recognition data store 123. However, it should be understood that the moving platform(s) 101 and/or the client device(s) 117 may additionally and/or alternatively store the recognition data store 123. For instance, the moving platform(s) 101 and/or the client device(s) 117 may include an instance of the recognition data store 123, may cache data from the recognition data store 123 (e.g., download the pattern recognition data at various intervals), etc. For instance, recognition data may be pre-stored/installed in the moving platform(s) 101, stored and/or refreshed upon setup or first use, replicated at various intervals, etc. In further embodiments, data from the recognition data store 123 may be requested and downloaded at runtime. Other suitable variations are also possible and contemplated.

The recognition data store 123 may reflect a language framework. The recognition data may include predefined semantic terms for describing user actions. For example, a semantic term description may describe one or more of the following action: user is turning head left, user is turning head right, user is looking backwards, user is looking ahead, user is moving right foot from a gas pedal to a brake pedal, user is moving left hand clockwise on a steering wheel, user is turning the steering wheel counterclockwise, vehicle is changing to left lane, vehicle is making a right turn, vehicle is backing, vehicle is parking, vehicle is making a U-turn, vehicle is certain distance from obstacle, vehicle is accelerating, vehicle is braking, etc.

As further examples, a semantic term description may quantify input signal data and user's action. For instance, a sematic term may describe that: driver is moving left hand clockwise 30 degree on a steering wheel, or vehicle is making 70 degree left turn at 10 mph, vehicle is running at 70 mph at a local street, driver's eyes are drowsy, etc. In some embodiments, the predefined semantic terms may provide a common terminology basis for presenting input signal data and output anticipations of user's action understandable by the integrative cognition engine 105, the user(s) 115, and/or the moving platform(s) 101. In some embodiments, the recognition data store 123 may include or be part of a database management system (DBMS) for storing and providing access to data, as discussed elsewhere herein.

The client device(s) 117 are computing devices that include memory(ies), processor(s), and communication unit(s). The client device(s) 117 are coupleable to the network 111 and may send and receive data to and from one or more of the modeling server 121, map server 131, and the moving platform(s) 101 (and/or any other components of the system coupled to the network 111). Non-limiting examples of client device(s) 117 include a laptop computer, a desktop computer, a tablet computer, a mobile telephone, a personal digital assistant (PDA), a mobile email device, or any other electronic devices capable of processing information and accessing a network 111. In some embodiments, the client device(s) 117 may include one or more sensors 103b, and an integrative cognition engine 105b.

In some embodiments, the client device(s) 117 may include an instance of a navigation application 107b, which may provide navigation instructions to user(s) 115, and/or GPS information to an integrative cognition engine 105. The user(s) 115 may interact with the client device(s) 117, as illustrated by signal line 106. Although FIG. 1 illustrates one client device 117, the system 100 may include a plurality of client devices 117.

The moving platform(s) 101 include computing devices having memory(ies), processor(s), and communication unit(s). Examples of such computing devices may include an electronic control unit (ECU) or other suitable processor, which is coupled to other components of the moving platform(s) 101, such as one or more sensors 103, actuators, motivators, etc. The moving platform(s) 101 may be coupled to the network 111 via signal line 102, and may send and receive data to and from one or more of the modeling server 121, the map server 131, and the client device(s) 117. In some embodiments, the moving platform(s) 101 are capable of transporting from one point to another. Non-limiting examples of the moving platform(s) 101 include a vehicle, an automobile, a bus, a boat, a plane, a bionic implant, or any other moving platforms with non-transitory computer electronics (e.g., a processor, a memory or any combination of non-transitory computer electronics). The user(s) 115 may interact with the moving platform(s) 101, as reflected by signal line 104. The user(s) 115 may be a human user operating the moving platform(s) 101. For example, the user(s) 115 may be a driver of a vehicle.

The moving platform(s) 101 may include one or more sensors 103a, a CAN data store 109, an integrative cognition engine 105a, and an instance of a navigation application 107a. Although FIG. 1 illustrates one moving platform 101, the system 100 may include a plurality of moving platforms 101.

The CAN data store 109 stores various types of vehicle operation data (also sometimes referred to as vehicle CAN data) being communicated between different components of a given moving platform 101 using the CAN. In some embodiments, the vehicle operation data is collected from multiple sensors 103a coupled to different components of the moving platform(s) 101 for monitoring operating states of these components. Examples of the vehicle CAN data include, but are not limited to, transmission, speed, acceleration, deceleration, wheel speed (Revolutions Per Minute—RPM), wheel slip, traction control information, windshield wiper control information, steering angle, braking force, etc. In some embodiments, the vehicle operation data may also include location data (e.g., GPS coordinates) describing current location of the moving platform(s) 101. Other standard vehicle operation data are also contemplated. In some embodiments, the CAN data store 109 may be part of a data storage system (e.g., a standard data or database management system) for storing and providing access to data.

The sensor(s) 103a and/or 103b (also referred to just as 103) may include any type of sensors suitable for the moving platform(s) 101 and/or the client device(s) 117. The sensor(s) 103 may be configured to collect any type of signal data suitable to determine characteristics of a moving platform 101 and/or its internal and external environments. Non-limiting examples of the sensor(s) 103 include various optical sensors (CCD, CMOS, 2D, 3D, light detection and ranging (LIDAR), cameras, etc.), audio sensors, motion detection sensors, barometers, altimeters, thermocouples, moisture sensors, IR sensors, radar sensors, other photo sensors, gyroscopes, accelerometers, speedometers, steering sensors, braking sensors, switches, vehicle indicator sensors, windshield wiper sensors, geo-location sensors, transceivers, sonar sensors, ultrasonic sensors, touch sensors, proximity sensors, etc.

The sensor(s) 103 may also include one or more optical sensors configured to record images including video images and still images of an inside or outside environment of a moving platform 101, record frames of a video stream using any applicable frame rate, encode and/or process the video and still images captured using any applicable methods, and/or capture images of surrounding environments within their sensing range. For instance, in the context of a moving platform 101, the sensor(s) 103a may capture the environment around the moving platform 101 including roads, roadside structure, buildings, trees, dynamic road objects (e.g., surrounding moving platforms 101, pedestrians, road workers, etc.) and/or static road objects (e.g., lanes, traffic signs, road markings, traffic cones, barricades, etc.), etc. In some embodiments, the sensor(s) 103 may be mounted to sense in any direction (forward, rearward, sideward, upward, downward, facing etc.) relative to the path of a moving platform 101. In some embodiments, one or more sensors 103 may be multidirectional (e.g., LIDAR).

The sensor(s) 103 may additionally and/or alternatively include one or more optical sensors configured to record images including video images and still images of a user's activity, record frames of a video stream using any applicable frame rate, and/or encode and/or process the video and still images captured using any applicable methods. For instance, in the context of a moving platform 101, the sensor(s) 103a may capture the user's operation of the moving platform 101 including moving forward, backing, turning left, turning right, changing to a left lane, changing to a right lane, making a U-turn, stopping, making an emergency stop, losing control on a slippery road, etc. In some embodiments, the sensor(s) 103 may determine the operations of the moving platform 101 by capturing the user's steering action, and braking activities, etc. In one or more embodiments, the sensor(s) 103 may capture user's action and activities that are not directly related to the motions of the moving platform(s) 101, such as the user's feeling on the face, head directions, hand locations, and other activities that might or might not affect the user's operations of the moving platform(s) 101. As further example, the image data may reflect an aspect of a moving platform 101 and/or the user 115, such as a series of image frames monitoring a user's head motion for a period of time, etc.

The sensor(s) 103a may optionally include one or more signal receivers configured to record, transmit the vehicle information to other surrounding moving platforms 101, and receive information from the other surrounding moving platforms 101. The information received from the other moving platforms 101 by the sensor(s) 103 may be communicated to other components of the moving platform(s) 101 for further processing, such as to an integrative cognition engine 105 for monitoring movements of the other moving platforms 101.

The processor(s) 213 (e.g., see FIG. 2) of the moving platform(s) 101 and/or the client device(s) 117 may receive and process the sensor data. In the context of a moving platform 101, the processor(s) 213 may include an electronic control unit (ECU) implemented in the moving platform 101 such as a vehicle, although other moving platform types are also contemplated. The ECU may receive and store the sensor data as vehicle operation data in the CAN data store 109 for access and/or retrieval by the integrative cognition engine 105a. In further examples, the vehicle operation data are more directly provided to the integrative cognition engine 105 (e.g., via the vehicle bus, via the ECU, etc., upon being received and/or processed). Other suitable variations are also possible and contemplated. As a further example, one or more sensors 103 may capture a time-varying image data of the user 115 operating a moving platform 101, where the image data depict activities (such as looking left, looking right, moving the right foot from the gasoline pedal to the brake pedal, moving hands around the steering wheel) of the user 115 in preparing for next action for operating the moving platform 101. The integrative cognition engine 105 may receive the image data (e.g., real-time video stream, a series of static images, etc.) from the sensor(s) 103 (e.g., via the bus, ECU, etc.) and process it to determine what action the user 115 will take in the next, as discussed further elsewhere herein.

The modeling server 121, the moving platform(s) 101, and/or the client device(s) 117 may include instances 105a, 105b, and 105c of the integrative cognition engine (also referred to herein as simply 105). In some configurations, the integrative cognition engine 105 may be distributed over the network 111 on disparate devices in disparate locations, in which case the client device(s) 117, the moving platform(s) 101, and/or the modeling server 121 may each include an instance of the integrative cognition engine 105 comprising aspects (same, similar, different, etc.) of the integrative cognition engine 105. For example, each instance of the integrative cognition engine 105a, 105b, and 105c may comprise one or more of the sub-components depicted in FIG. 2B, and/or different variations of theses sub-components, which are discussed in further detail below. In some configurations, the integrative cognition engine 105 may be a native application comprising all of the elements depicted in FIG. 2B, for example.

The integrative cognition engine 105 includes computer logic operable to receive and process signal data from the sensor(s) 103, recognize spatial and temporal patterns s of the signal data, generate anticipations of user's future action, generate and execute counter measures, such as generate warning(s) and/or implement compensating action to avert risks that might be confronting the user 115, the moving platform(s) 101, and/or associated objects. In some embodiments, the integrative cognition engine 105 may be implemented using software executable by one or more processors of one or more computer devices, using hardware, such as but not limited to a field-programmable gate array (FPGA), an application-specific integrated circuit (ASIC), etc., and/or a combination of hardware and software, etc. The integrative cognition engine 105 is described below in more detail.

The navigation application 107 includes computer logic operable to provide navigation instructions to a user 115, display information, receive input, etc. In some embodiments, the navigation application 107 may be implemented using software executable by one or more processors of one or more computer devices, using hardware, such as but not limited to a field-programmable gate array (FPGA), an application-specific integrated circuit (ASIC), etc., and/or a combination of hardware and software, etc.

The navigation application 107 may utilize data from the sensor(s) 103, such as a geo-location transceiver (e.g., GPS transceiver, cellular radio, wireless radio, etc.), configured to receive and provide location data (e.g., GPS, triangulation, cellular triangulation, etc.) for a corresponding computing device, vehicle sensors, etc. For example, the moving platform(s) 101 and/or the client device(s) 117 may be equipped with such a geo-location transceiver and the corresponding instance of the navigation application 107 may be configured to receive and process location data from such a transceiver. The navigation application 107 is discussed in further detail below.

The map server 131 includes a hardware and/or virtual server having a processor, a memory, and network communication capabilities. In some embodiments, the map server 131 receives and sends data to and from one or more of the modeling server 121, the moving platform(s) 101, and the client device(s) 117. For example, the map server 131 sends data describing a map of a geo-spatial area to one or more of the integrative cognition engine 105 and the navigation application 107. The map server 131 is communicatively coupled to the network 111 via signal line 112. In some embodiments, the map server 131 may include a map database 132 and a point of interest (POI) database 134.

The map database 132 stores data describing maps associated with one or more geographic regions. In some embodiments, map data may describe the one or more geographic regions at street level. For example, the map data may include information describing one or more lanes associated with a particular road. More specifically, the map data may describe the direction of travel of a road, the number of lanes on that road, exits and entrances to that road, whether one or more lanes have special status (e.g., are carpool lanes), the condition of the road in those lanes, traffic and/or accident data for those lanes, traffic controls associated with those lanes, (e.g., lane markings, pavement markings, traffic signals, traffic signs, etc.), etc. In some embodiments, the map database 132 may include and/or be associated with a database management system (DBMS) for storing and providing access to data.

The point of interest (POI) database 134 stores data describing (POIs) for various geographic regions. For example, the POI database 134 stores data describing tourist attraction, hotels, restaurants, gas stations, university stadiums, landmarks, etc., along various road segments. In some embodiments, the POI database 134 may include a database management system (DBMS) for storing and providing access to data.

It should be understood that the system 100 illustrated in FIG. 1 is representative of an example system and that a variety of different system environments and configurations are contemplated and are within the scope of the present disclosure. For instance, various acts and/or functionality may be moved from a modeling server 121 to a client devices 117, or vice versa, data may be consolidated into a single data store or further segmented into additional data stores, and some embodiments may include additional or fewer computing devices, servers, and/or networks, and may implement various functionality client or server-side. Further, various entities of the system may be integrated into a single computing device or system or divided into additional computing devices or systems, etc.

Figure 2A:
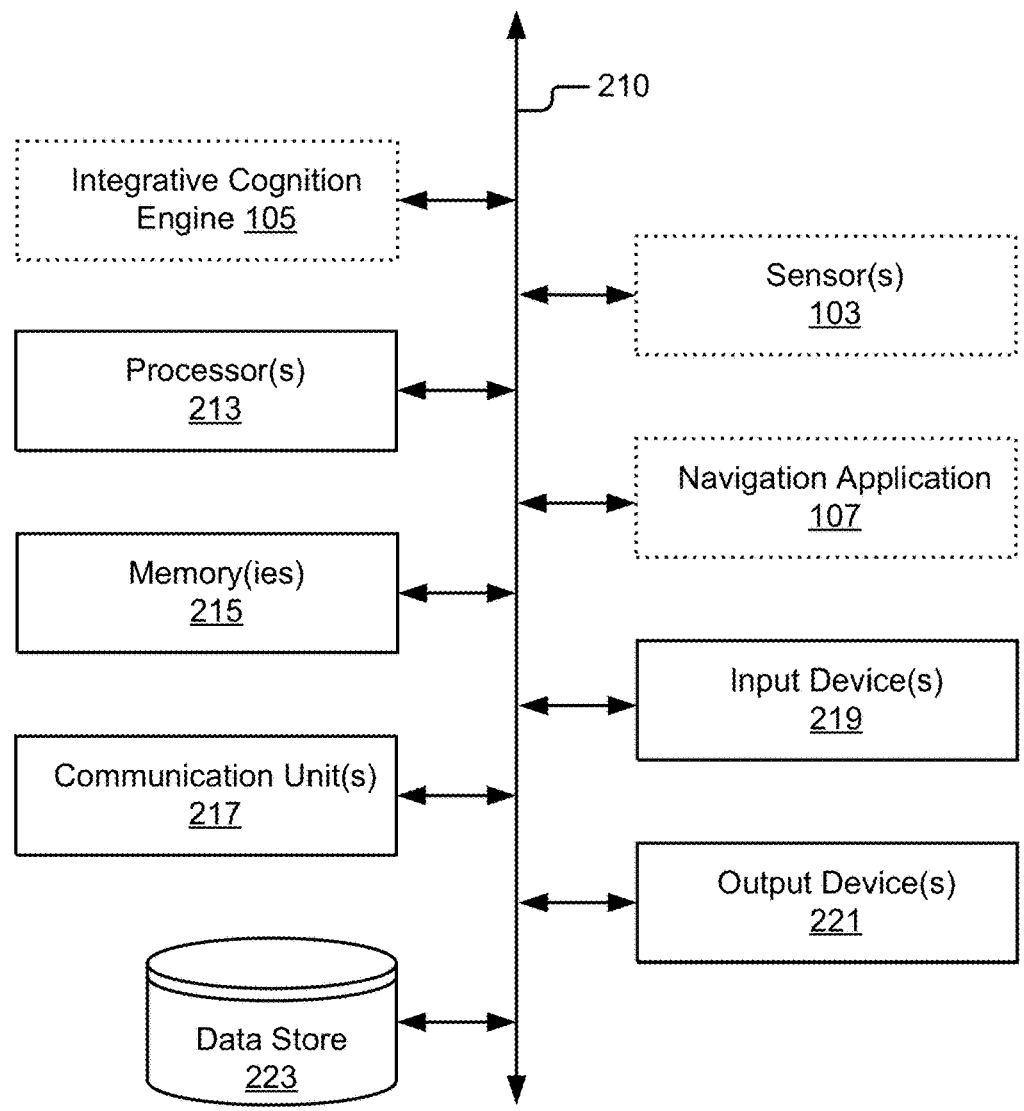
FIG. 2A is a block diagram of an example computing device.

FIG. 2A is a block diagram of an example computing device 200, which may represent the architecture of a modeling server 121, a client device 117, a moving platform 101, or a map server 131.

As depicted, the computing device 200 includes one or more processors 213, one or more memories 215, one or more communication units 217, one or more input devices 219, one or more output devices 221, and a data store 223. The components of the computing device 200 are communicatively coupled by a bus 210. In some embodiments where the computing device 200 represents the server 101, the client device(s) 117, or the moving platform(s) 101, the computing device 200 may include one or more integrative cognition engines 105, one or more sensors 103, and one or more navigation applications 107.

The computing device 200 depicted in FIG. 2A is provided by way of example and it should be understood that they may take other forms and include additional or fewer components without departing from the scope of the present disclosure. For example, while not shown, the computing device 200 may include various operating systems, software, hardware components, and other physical configurations.

In some embodiments where the computing device 200 is included or incorporated in moving platform(s) 101, the computing device 200 may include and/or be coupled to various platform components of the moving platform(s) 101, such as a platform bus (e.g., CAN), one or more sensors, automotive sensors, acoustic sensors, video sensors, chemical sensors, biometric sensors, positional sensors (e.g., GPS, compass, accelerometer, gyroscope, etc.), switches, and controllers, cameras, etc.) an engine, drivetrain parts, suspension components, instrumentation, climate control, and/or any other electrical, mechanical, structural, and mechanical components that are considered as necessary for the moving platform(s) 101. In these embodiments, the computing device 200 may embody, be incorporated in, or include an ECU, ECM, PCM, etc. In further embodiments, the computing device 200 may be an embedded system embedded in a moving platform 101.

The processor(s) 213 may execute software instructions by performing various input/output, logical, and/or mathematical operations. The processor(s) 213 may have various computing architectures to process data signals including, for example, a complex instruction set computer (CISC) architecture, a reduced instruction set computer (RISC) architecture, and/or an architecture implementing a combination of instruction sets. The processor(s) 213 may be physical and/or virtual, and may include a single core or plurality of processing units and/or cores. In some embodiments, the processor(s) 213 may be capable of generating and providing electronic display signals to a display device (not shown), supporting the display of images, capturing and transmitting images, performing complex tasks including various types of feature extraction and sampling, etc. In some embodiments, the processor(s) 213 may be coupled to the memory(ies) 215 via the bus 210 to access data and instructions therefrom and store data therein. The bus 210 may couple the processor(s) 213 to the other components of the computing device 200 including, for example, the memory(ies) 215, the communication unit(s) 217, the sensor(s) 103, the integrative cognition engine 105, the navigation application 107, the input device(s) 219, the output device(s) 221, and/or and the data store 223.

The memory(ies) 215 may store and provide access to data to the other components of the computing device 200. In some embodiments, the memory(ies) 215 may store instructions and/or data that may be executed by the processor(s) 213. For example, depending on the configuration of the computing device 200, the memory(ies) 215 may store one or more instances of the integrative cognition engine 105 and/or one or more instances of the navigation applications 107. The memory(ies) 215 are also capable of storing other instructions and data, including, for example, various data described elsewhere herein, an operating system, hardware drivers, other software applications, databases, etc. The memory(ies) 215 may be coupled to the bus 210 for communication with the processor(s) 213 and the other components of computing device 200.

The memory(ies) 215 include one or more non-transitory computer-usable (e.g., readable, writeable, etc.) media, which may be any tangible non-transitory apparatus or device that may contain, store, communicate, propagate or transport instructions, data, computer programs, software, code, routines, etc., for processing by or in connection with the processor(s) 213. In some embodiments, the memory(ies) 215 may include one or more of volatile memory and non-volatile memory. For example, the memory(ies) 215 may include, but are not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 215 may be a single device or may include multiple types of devices and configurations.

The communication unit(s) 217 transmit data to and receive data from other computing devices to which they are communicatively coupled (e.g., via the network 111) using wireless and/or wired connections. The communication unit(s) 217 may include one or more wired interfaces and/or wireless transceivers for sending and receiving data. The communication unit(s) 217 may couple to the network 111 and communicate with other computing nodes, such as client device(s) 117, moving platform(s) 101, and/or server(s) 121, etc. (depending on the configuration). The communication unit(s) 217 may exchange data with other computing nodes using standard communication methods, such as those discussed above.

The bus 210 may include a communication bus for transferring data between components of a computing device 200 or between computing devices, a network bus system including the network 111 and/or portions thereof, a processor mesh, a combination thereof, etc. In some embodiments, the bus 210 may represent one or more buses including an industry standard architecture (ISA) bus, a peripheral component interconnect (PCI) bus, a universal serial bus (USB), or some other bus known to provide similar functionality. Additionally and/or alternatively, the various components of the computing device 200 may cooperate and communicate via a software communication mechanism implemented in association with the bus 210. The software communication mechanism may include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The data store 223 includes non-transitory storage media that store data. A non-limiting example non-transitory storage medium may include a dynamic random access memory (DRAM) device, a static random access memory (SRAM) device, flash memory, a hard disk drive, a floppy disk drive, a disk-based memory device (e.g., CD, DVD, Blu-ray™, etc.), a flash memory device, or some other known, tangible, volatile or non-volatile storage devices. Depending on the computing device reflected by FIG. 2A, the data store 223 may represent one or more of the CAN data store 109, the recognition data store 123, the POI database 134, and the map database 132, although other data store types are also possible and contemplated.

The data store 223 may be included in the one or more memories 215 of the computing device 200 or in another computing device and/or storage system distinct from but coupled to or accessible by the computing device 200. In some embodiments, the data store 223 may store data in association with a DBMS operable by the modeling server 121, the map server 131, the moving platform(s) 101, and/or the client device(s) 117. For example, the DBMS could include a structured query language (SQL) DBMS, a NoSQL DMBS, etc. In some instances, the DBMS may store data in multi-dimensional tables comprised of rows and columns, and manipulate, e.g., insert, query, update and/or delete, rows of data using programmatic operations.

The input device(s) 219 may include any standard devices configured to receive a variety of control inputs (e.g., gestures, voice controls) from a user 115 or other devices. Non-limiting example input device 219 may include a touch screen (e.g., LED-based display) for inputting texting information, making selection, and interacting with the user 115; motion-detecting input devices; audio input devices; other touch-based input devices; keyboards; pointer devices; indicators; and/or any other inputting components for facilitating communication and/or interaction with the user 115 or the other devices. The input device(s) 219 may be coupled to the computing device 200 either directly or through intervening controllers to relay inputs/signals received from users 115 and/or sensor(s) 103.

The output device(s) 221 may include any standard devices configured to output or display information to a user 115 or other devices. Non-limiting example output device(s) 221 may include a touch screen (e.g., LED-based display) for displaying navigation information to the user 115, an audio reproduction device (e.g., speaker) for delivering sound information to the user 115, a display/monitor for presenting texting or graphical information to the user 115, etc. The outputting information may be text, graphic, tactile, audio, video, and other information that may be understood by the user 115 or the other devices, or may be data, logic, programming that can be readable by the operating system of the moving platform(s) 101 and/or other computing devices. The output device(s) 221 may be coupled to the computing device 200 either directly or through intervening controllers.

Figure 2B:
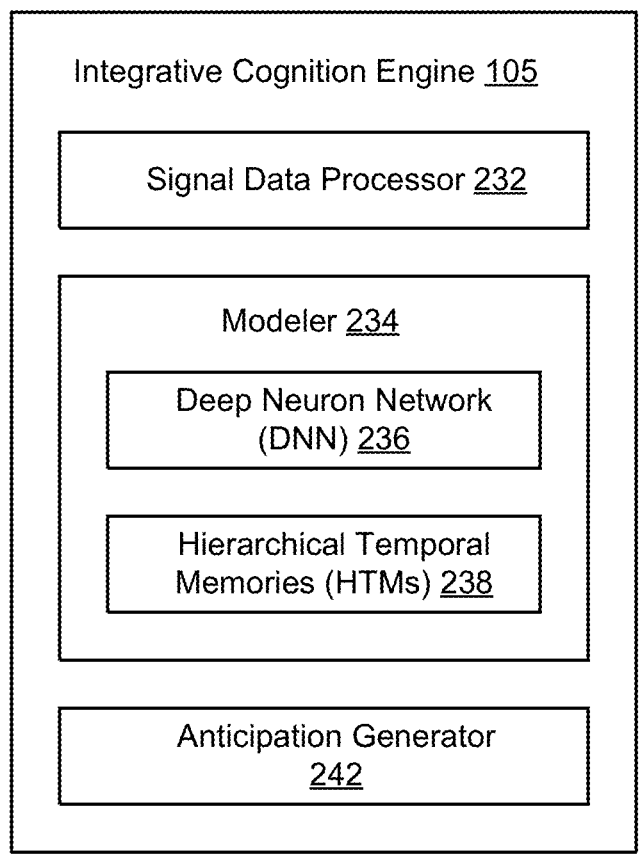
FIG. 2B is a block diagram of an example integrative cognition engine.

FIG. 2B is a block diagram of an example integrative cognition engine 105. As illustrated, the integrative cognition engine 105 may include various subcomponents, such as a signal data processor 232, a modeler 234, and an anticipation generator 242.

The signal data processor 232, the modeler 234, and the anticipation generator 242 may be implemented as software, hardware, or a combination of the foregoing. In some embodiments, the signal data processor 232, the modeler 234, and the anticipation generator 242 may be communicatively coupled by the bus 210 and/or the processor(s) 213 to one another and/or the other components of the computing device 200. In some embodiments, one or more of the components 105, 232, 234, and/or 242 are sets of instructions executable by the processor(s) 213. In further embodiments, one or more of the components 105, 232, 234, and/or 242 are storable in the memory(ies) 215 and are accessible and executable by the processor(s) 213. In any of the foregoing embodiments, these components 105, 232, 234, and/or 242 may be adapted for cooperation and communication with the processor(s) 213 and other components of the computing device 200.

The signal data processor 232 includes computer logic operable to process signal data for input into the modeler 234. The signal data processor 232 may filter, structure, and/or format the signal data for pattern recognition performed by the modeler 234. In some embodiments, signal data received by the sensor(s) 103 may include noise and/or unnecessary information. The signal data processer 232 may analyze the received signal data and remove the noise and/or unnecessary information of the signal data. In some embodiments, signal data received by the sensor(s) 103 may contain different features and/or formats. The signal data processer 232 may filter various features and/or normalize these different formats to be compatible with the modeler 234.

The signal data processor 232 may be coupled to the sensor(s) 103, the data store 223, and/or other components of the computing device 200 to receive signal data associated with a moving platforms 101. In some embodiments, the signal data processor 232 may receive audio and/or image data and/or geo-location data (e.g., GPS coordinates, triangulation data, etc.) associated with current location of the moving platform(s) 101, for example, from a transceiver (e.g., GPS device), a positioning system, and/or the CAN data store 109. The signal data processor 232 may then process the received signal data, as discussed elsewhere herein. After data processing, the signal data processor 232 may pass the processed signal data to the modeler 234. In some embodiments, signal data may be handled by the modeler 234 without processing, and the signal data processor 232 may therefore directly pass the received signal data to the modeler 234 or the modeler 234 may bypass the signal data processor 232 and receive the signal data directly.

The modeler 234 includes computer logic operable to model driver behavior using input data. In some embodiments, as discussed in further detail/elsewhere herein, the input data may include signal data processed by the signal data processor 234. In some embodiments, the input data may include signal data received directly from sensor(s) 103, another intervening component (e.g., a controller), the data store 223, and/or other components of the computing device 200. The modeler 234 may then model the received input data by identifying specific pattern candidates, and recognize one or more of the candidates. For instance, the modeler 234 may recognize spatial and temporal patterns from the data.

The modeler 234 may be adapted for cooperation and communication with the processor(s) 213, the memory(ies) 215, and/or other components of the computing device 200 via the bus 210. In some embodiments, the modeler 234 may store data, commands, and/or modeling data, such as data related to the recognition of spatial and/or temporal patterns, and for the generation of anticipations. The modeler 234 may be coupled to the anticipation generator 242 to output the recognized spatial and/or temporal patterns. In some embodiments, the modeler 234 includes separate components for recognizing different patterns in the input signal data. For instance, the modeler 234 may include a deep neuron network (DNN) 236 to recognize spatial patterns and hierarchical temporal memories (HTM) 238 to recognize temporal patterns of the input data.

The DNN 236 includes computer logic operable to recognize spatial patterns from the input data, and cooperate with HTMs 238 to recognize temporal patterns from the input data. In some embodiments, the DNN 236 may transform the signal data to identify spatial representation(s) in the signal data. In some embodiments, the DNN 236 may transform the signal data through a chain of transformations to generate an output. In doing so, the DNN 236 may represent an artificial neuron. The DNN 236 may use the chain of transformations, whose parameters may be learned through a training process as discussed elsewhere herein, to determine the correlations between the input data and predefined outcomes.

The DNN 236 may include one or more variants of deep architectures for signal data recognition and inference. Each architecture may contain different configurations, algorithms, and/or procedures. For instance, the DNN 236 may include, but not limited to, a convolutional neural network, a deep belief network, a convolutional deep belief network, a large memory storage and retrieval neural network, a deep Boltzmann machine (DBM), a deep staking network, a compound hierarchical-deep model, a deep coding network, a multiplayer kernel machine, etc. The determination of which architecture(s) to be used in the DNN 236 may depend on the input signal data, inference accuracy requirement, computing cost, inference efficiency, and/or other factors. One should appreciate that the DNN 236 may use other suitable architecture variants to recognize spatial patterns in the input data.

In some embodiments, the DNN 236 may include various components to perform the spatial pattern recognition. For instance, the DNN 236 may include a training component, a validation component, a testing component, and/or other components to determine initial correlations between input data and output user's action for a specific user 115. In some embodiments, the training component may initialize and/or tune the parameters in the algorithms that define correlations between input data and patterns reflecting user actions in a training process. The validation component may then validate the parameters in the defined correlations, and the testing component may further test whether the defined correlations satisfy expectations. The DNN 236 may then store the parameters of algorithms for validated correlations as weights of the DNN 236.

The DNN 236 may be coupled to the signal data processer 232, the HTM 238, the anticipation generator 242, and/or adapted for cooperation and communication with the processor(s) 213, the memory(ies) 215, and other components of the computing device 200. For instance, the DNN 236 may receive input data from the signal data processor 232, identify spatial representations, cooperate with the associated HTMs 238 for temporal predictions, recognize spatial patterns based on the spatial representations, cooperation with the associated recognition HTM 238 for temporal pattern recognition, and so on and so forth, as discussed in further detail below.

The HTMs 238 include computer logic operable to recognize temporal patterns in input data. The HTMs 238 may receive the input data from the DNN 236. In some embodiments, the data received from the DNN 236 may contain time-varying information and thus include temporal sequences of spatial patterns in the data. The HTMs 238 may then identify and/or recognize temporal patterns in the time-varying signal data. Intermediate temporal patterns may be referred to in some cases as temporal predictions.

In some embodiments, a given HTM 238 may be configured as a hierarchical organization of subunits (also called cells) for temporal pattern memorization and/or recognition. Each cell may be configured to have different states, such as active, inactive, or predictive. A distribution pattern of different states of the cells in the hierarchical organization at one time point may represent a time point data information of time-varying data. In some embodiments, the HTM 238 may store data information in a distributed fashion with each pattern of distribution of states of the cells representing a time point data of time-varying data, and temporal sequence of dynamic change of distribution (of states of the cells) representing the time-varying data.

The HTMs 238 may be coupled to different layers of the DNN 236, the anticipation generator 242, and/or adapted for cooperation and communication with the processor(s) 213, the memory(ies) 215, and/or other components of the computing device 200. For instance, the HTM 238 may iteratively receive input data the DNN 236, process temporal pattern candidates (also called temporal predictions) each in set of input data, pass the temporal pattern candidates to the corresponding layers of the DNN 236, recognize temporal patterns from the candidates, and pass the recognized temporal pattern back to the DNN 236 for anticipation generation and/or output. In some cases, the HTM 238 may pass the recognized temporal patterns to the anticipation generator 242.

The anticipation generator 242 includes computer logic operable to generate an anticipation. The anticipation generator 242 may be coupled to the modeler 234, and/or components thereof, to receive outputs generated thereby, such as recognized spatial and/or temporal patterns. An anticipation means an anticipated future outcome determined based on one or more recognized spatial and/or temporal pattern(s). In some embodiments, the anticipation may include a set of outcomes, probabilities for those outcomes, and times at which those outcomes are predicted to occur, based on recognized temporal patterns. In some embodiments, in generating an anticipation, the anticipation generator 242 formats the temporal pattern(s) into a format processable by the navigation application 107.

The navigation application 107 includes computer logic operable to implement actions based on anticipations determined by the anticipation generator 242. In some embodiments, the action may further be determined using dynamic data describing environments associated with a corresponding moving platform 101. In some embodiments, the navigation application 107 may be adapted for cooperation and communication with the anticipation generator 242, the sensor(s) 103, the data stores 223, and/or other components to receive data.

In some embodiments, the navigation application 107 may determine instructions for an action based on the anticipation. The navigation application 107 may translate the spatial and/or temporal patterns represented by the anticipation to actions to be implemented. The navigation application 107 244 may in some cases store the action instructions for later retrieval thereby.

In some embodiments, to execute an action, the navigation application 107 may interact with other system 100 components. In some embodiments, the navigation application 107 may generate and execute instructions for transmitting and/or presented an electronic notification to notify a user 115, such as a driver, of a detected risk, threat, predicted outcome, etc. For instance, the navigation application 107 may call a software method configured to render notifications on a display, etc. In a further example, the navigation application 107 may signal one or more output devices 221 to provide notification and/or receive feedback to and/or from the user 115. The notification and/or feedback may be visual, auditory, and/or tactile. Example output devices 221 may include vibrate motors, speakers, displays, lights, etc. installed in a moving platform 101 and/or client device(s) 117. In some instances, the navigation application 107 may signal an intervening controller (e.g., ECU, microcontroller, etc.) with action instructions. It should be understood that other suitable variations of action execution are also possible and contemplated. The navigation application 107 may provide the notification to another application for providing to the user 115 in some cases.

The integrative cognition engine 105 depicted in FIG. 2B is provided by way of example. It should be understood that the integrative cognition engine 105 may take other forms and include additional or fewer components without departing from the scope of the present disclosure. For instance, integrative cognition engine 105 may include additional components such as, but not limited to, a configuration engine, a validation module, an encryption engine, etc. and/or these various components may be combined into a single engine or divided into additional engines.

Figure 3:
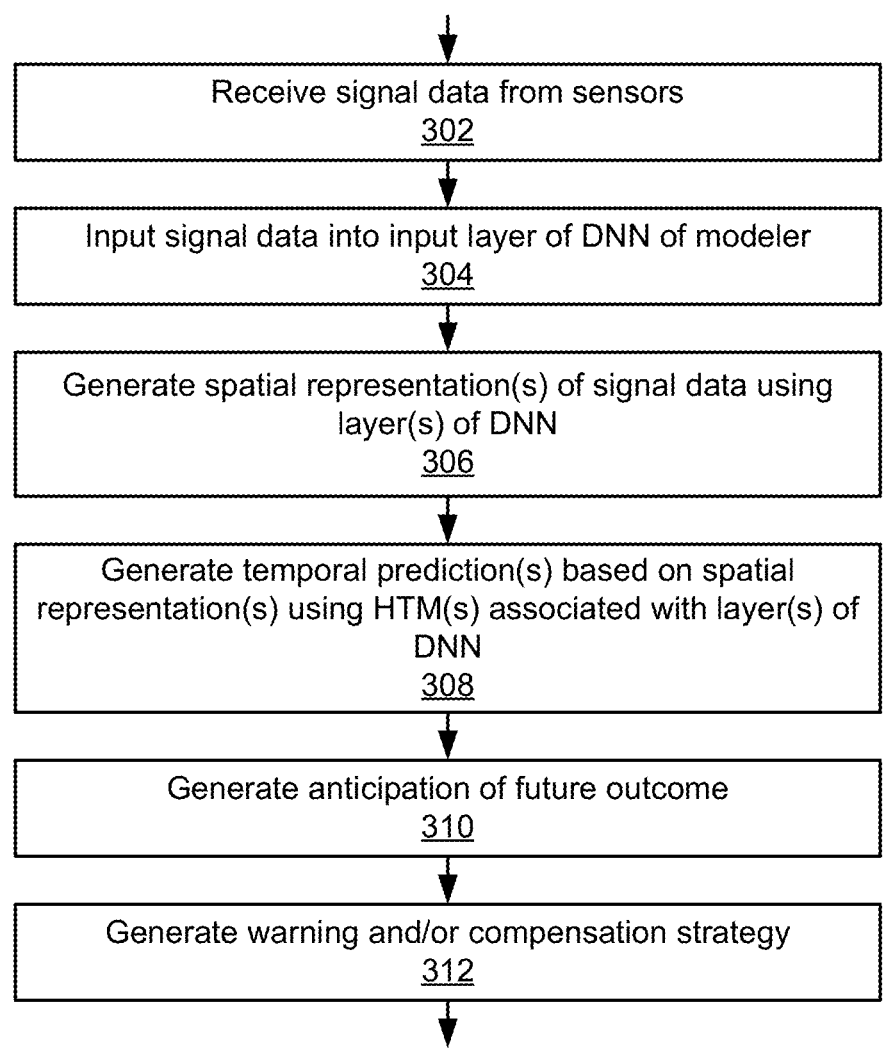
FIG. 3 is a flowchart of an example method for modeling driver behavior.

FIG. 3 is a flowchart of an example method 300 for modeling driver behavior. In block 302, the signal data processor 232 and/or the modeler 234 may receive, at a first time, signal data from one or more sensors 103 associated with a moving platform 101. The signal data received in block 302 may include a single set of signal data or multiple (two or more) sets of different types/modalities of signal data. In an embodiment where the signal data requires pre-processing, the signal data processor 232 may process the signal data and generate input data for the modeler 234.

The received single set of signal data may include any suitable format or type. For instance, the signal data may include an image data, audio data, geolocation data, CAN data, text data, etc., as discussed elsewhere herein.

In block 304, the sensor(s) 103 and/or signal data processor 232 may input the signal data into an input layer of a deep neural network (DNN), the DNN including one or more layers. For instance, the DNN 236 of the modeler 234 may receive signal data directly from the one or more sensors 103, or via an intervening component such as a data store or computing component (e.g. ECU, microcontroller, etc.). In block 306, the modeler 234 may generate spatial representation(s) of the signal data using the layer(s) of the DNN 236, and may generate temporal prediction(s) based on spatial representation(s) using HTM(s) 238 respectively associated with the layer(s) of the DNN.

In block 310, the anticipation generator 242 may generate an anticipation of a future outcome. The anticipation is embodied by anticipation data. The anticipation data may identify one or more future events and include probabilities for the future events. Additionally or alternatively, the anticipation may indicate a time that the future event may occur. For instance, the point in time may be a time frame when the future event is anticipated to occur (e.g., range of seconds, minutes, etc.), a specific point in time (e.g., in seconds, minutes, etc.) Example outcomes may include, driving situations (e.g., veering of other vehicles, stoppage of traffic, objects entering driving scene, driver responses (e.g., braking, steering, interaction with console, acceleration, etc.)) predicted to occur based on the signal data processed by the modeler 234.

In block 312, using the anticipation, the navigation application 107 may generate and implement an action related to the predicted future event. For instance, the navigation application 107 may output a warning signal via one or more output devices 221, autonomously control operation of the moving platform 101 to avert an anticipated potential risk, etc.

Figure 7A:
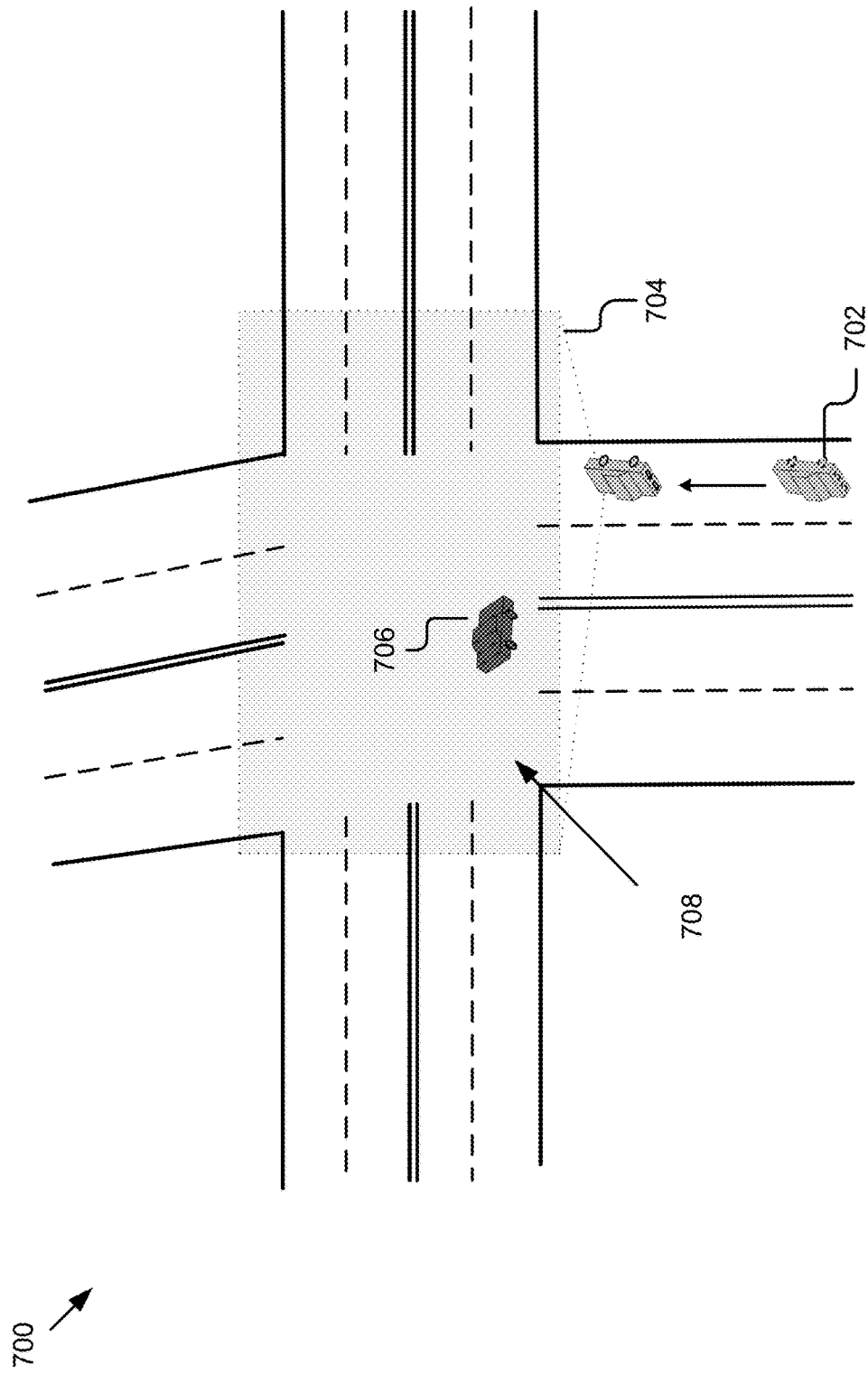
FIGS. 7A-E illustrate various different examples of signal data.

FIGS. 7A-7E illustrate various different examples of signal data. FIG. 7A in particular depicts example image data that may be captured and provided by external sensor(s) of a moving platform 101. The image data illustrated in the figure include aspect(s) of the environment outside the moving platform 101. In the illustrated example, the moving platform 101, a vehicle 702, is moving north in a four-lane road with two lanes for traffic in each direction. Sensor(s) 103, for instance, front facing image sensor(s), may be installed in the vehicle 702 to monitor the road condition in front of the vehicle 702. Image data, represented by the grey box 704, may be captured at the moment when the vehicle 702 is approaching the intersection 708. The image data contains road traffic data in front the vehicle 702 at that moment, such as a series of frames depicting another vehicle 706 located in the intersection and moving eastward.

Figure 7B:
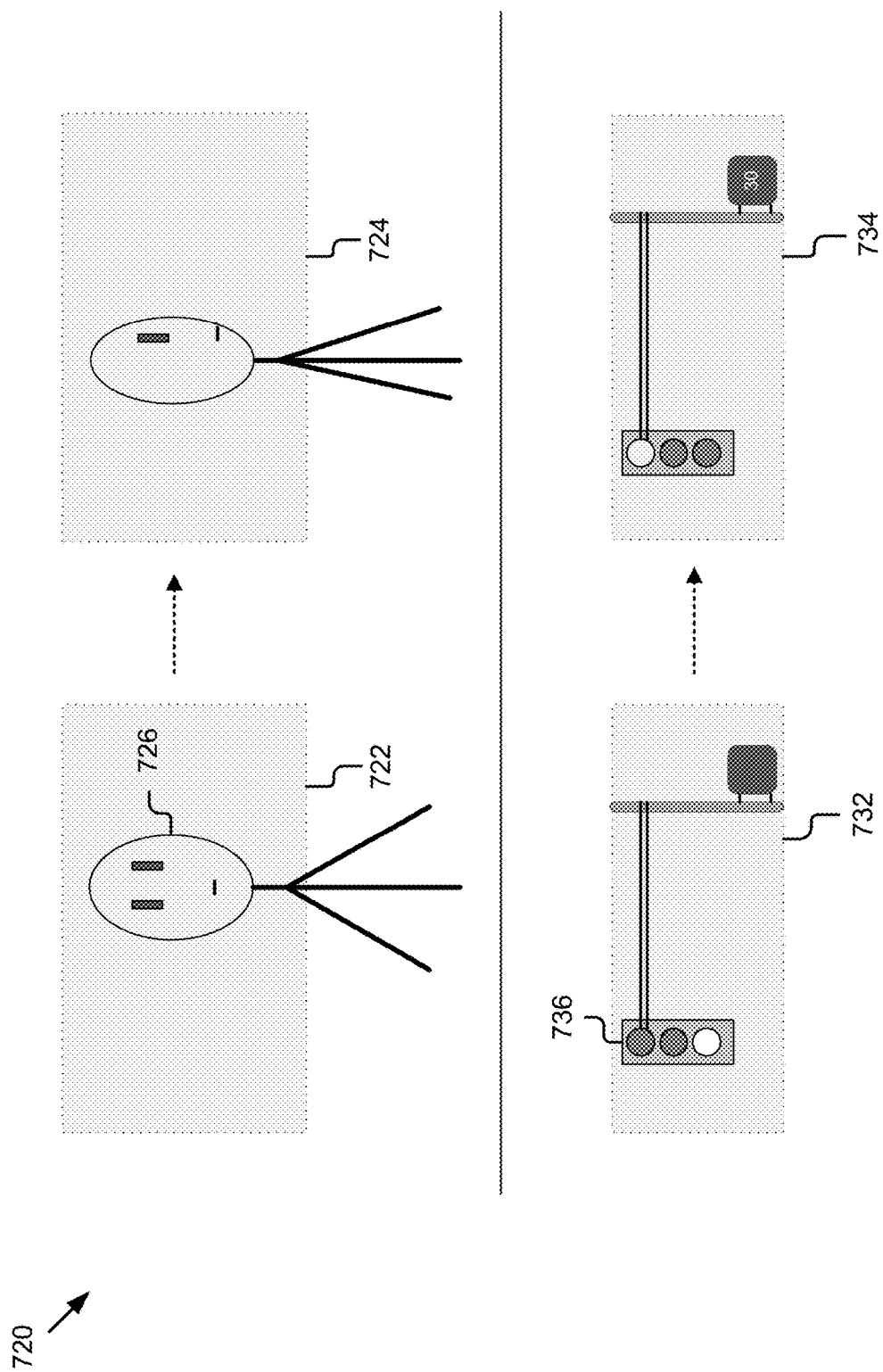

FIG. 7B depicts further examples of time-varying image data that may monitor the environments inside and/or outside a moving platform 101. The image data may include a series of images taken at different times. For instance, the images indicated by the grey boxes 722 and 724 respectively represent two images taken sequentially at different times to monitor a driver's head 726 motions inside a vehicle. The difference between the images 722 and 724 reflects that the driver is turning his/her head left. For another example, grey boxes 732 and 734 respectively represent two images taken sequentially at different times to monitor traffic control signal outside a vehicle. The difference between the images 732 and 734 reflects that the traffic light signal 736 has just changed from green (as shown in the image 732) to red (as shown in the image 734).

Figure 7D:
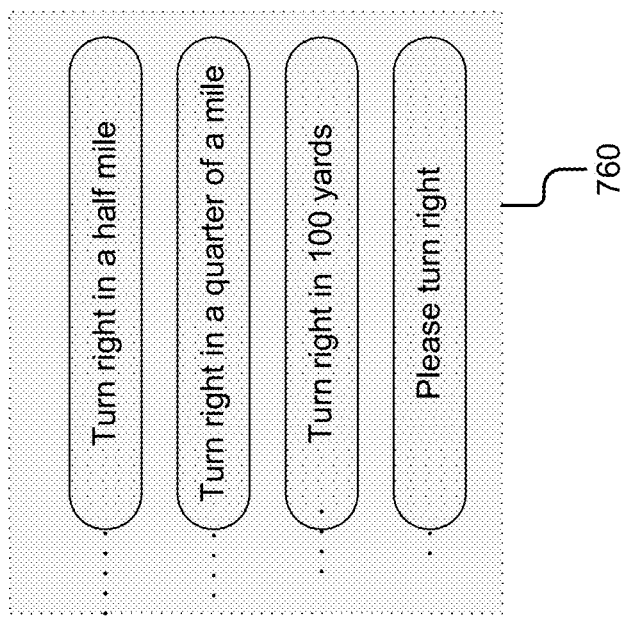
Figure 7C:
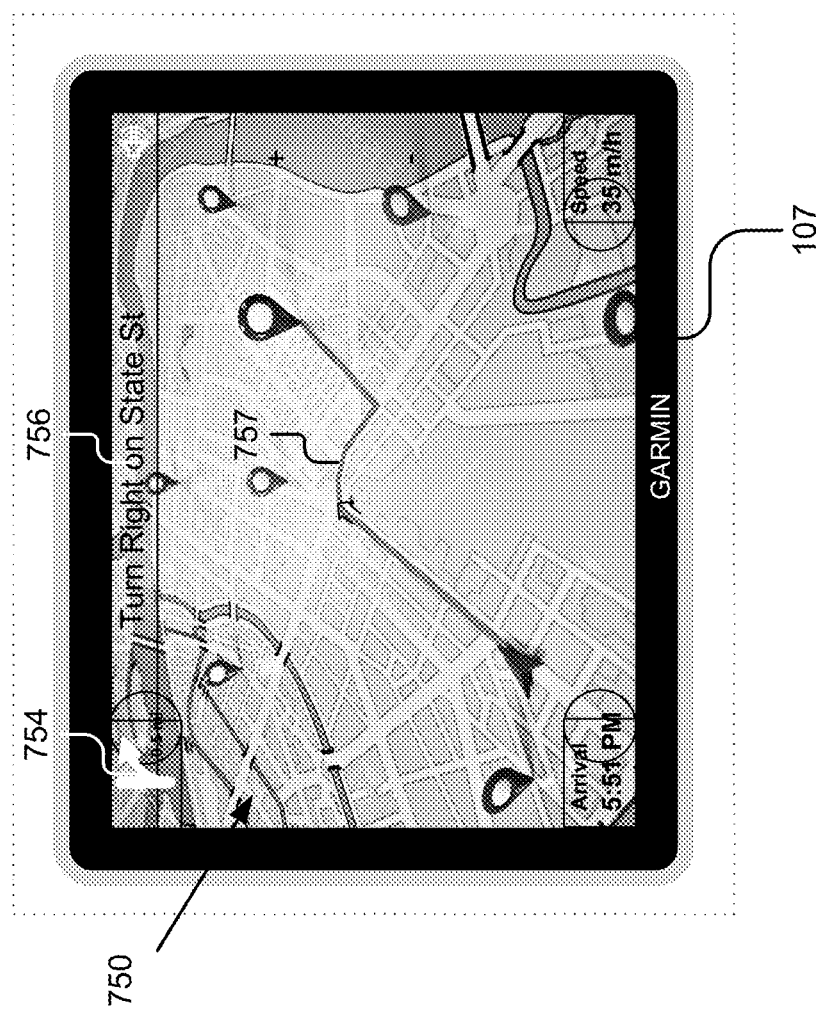

FIG. 7C depicts example signal data, which includes navigation data that may be received from a location device, such as a GPS or other suitable geolocation unit, by the signal data processor 232 and/or the modeler 234. In some embodiments, the navigation application 107 may be operable by the location device to provide navigation instructions to a driver, although other variations of the navigation application 107 are also possible and contemplated, as discussed elsewhere herein.

As illustrated in the grey box 752 of FIG. 7C, the navigation data may include information regarding previous, current, and future locations of a moving platform 101. For instance, the navigation data may include information regarding current status of the moving platform 101, such as speed, direction, current road, etc. The navigation data may also include future positions of the moving platform 101 based on a mapped navigation path, intended destination, turn-by-turn instructions, etc. as 754, 756, 757, and 760 show. The navigation data may additionally or alternatively include map data, audio data, and other data as discussed elsewhere herein. FIG. 7D depicts example turn-by-turn instructions for a user 101, which may be related to a route displayed to the user. The instructions may be output visually and/or audibly to the user 101 via one or more output devices 221 (e.g., a speaker, a screen, etc).

In some embodiments, audio data received by the signal data processor 232 and/or the modeler 234 may include any sound signals captured inside and/or outside the moving platform 101. Non-limiting examples of audio data include a collision sound, a sound emitted by emergency vehicles, an audio command, etc. In some embodiments, signal data may include time-varying directions for the driver of a vehicle.

Figure 7E:
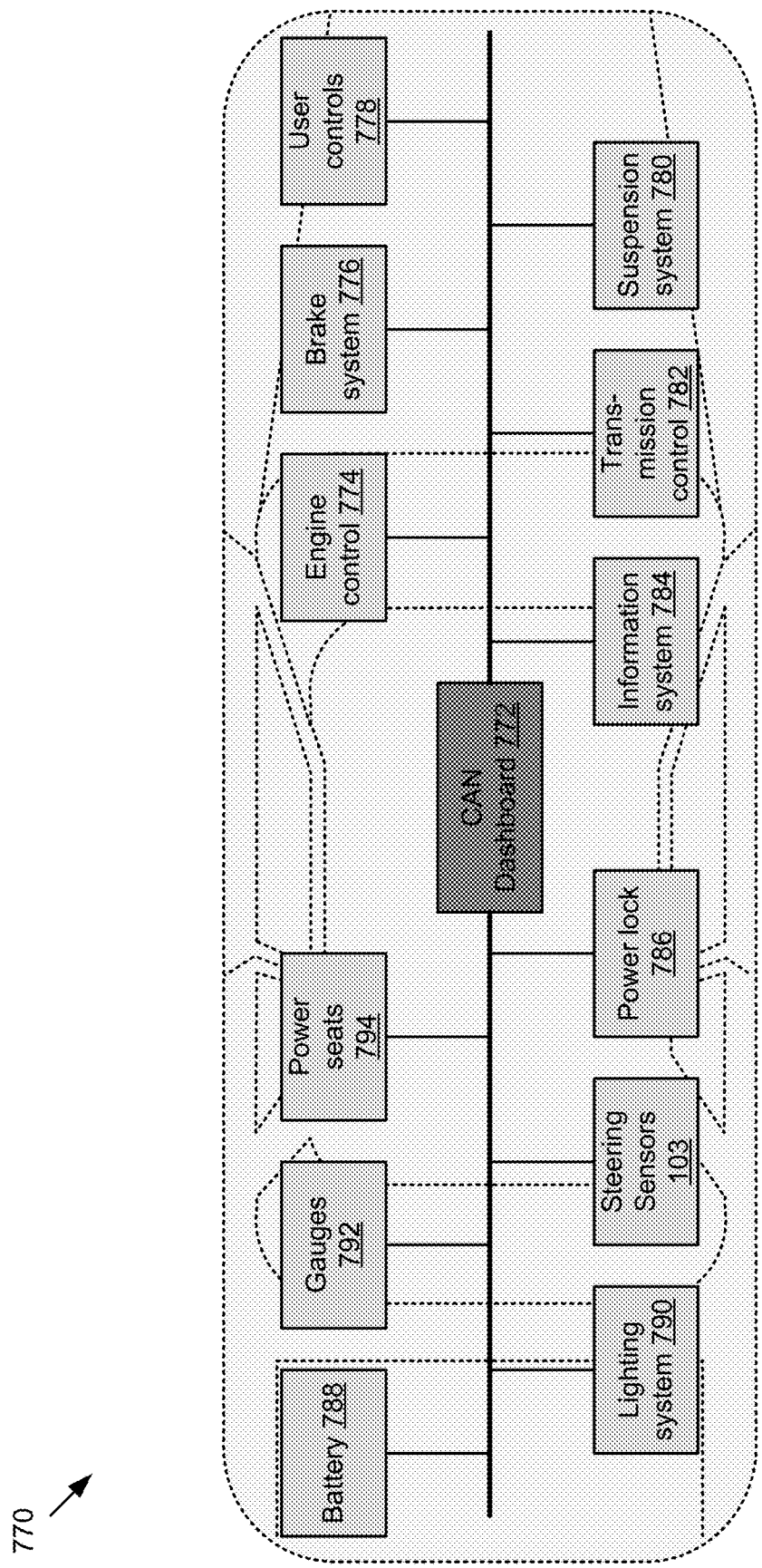

FIG. 7E depicts an example CAN network 770 from which CAN data may be extracted. The CAN network 770 may comprise one or more signal sources. For instance, the CAN network 770, and/or non-transitory memory that stores data captured by it, may comprises a collective signal source, or each of the constituent sets of sensors 103 (e.g., 774, 776, 778, etc.) included in the network 770 may each comprise signal courses.

The CAN network 770 may use a message-based protocol that allows microcontrollers and devices to communicate with each other without a host computer. The CAN network 770 may convert signals to data that may be stored and transmitted to the signal data processor 232, an ECU, a non-transitory memory, and/or other system 100 components. Signal data may come from any of the microcontrollers and devices of a vehicle, such as user controls 778, the brake system 776, the engine control 774, the power seats 794, the gauges 792, the batter(ies) 788, the lighting system 790, the steering and/or wheel sensors 103, the power locks 786, the information system 784 (e.g., audio system, video system, navigational system, etc.), the transmission control 782, the suspension system 780, etc.

In addition or alternatively to the example signal data discussed with reference to FIGS. 7A-E, it should be understood that numerous other types of signal data may also be used, such as electronic message data, other signal data, data from other moving platforms 101, data from predefined systems, etc. For instance, signal data received by a vehicle may include an electronic message data received from another incoming vehicle from the opposite direction, informing a planned/anticipated left turn in seconds.

Figure 4A:
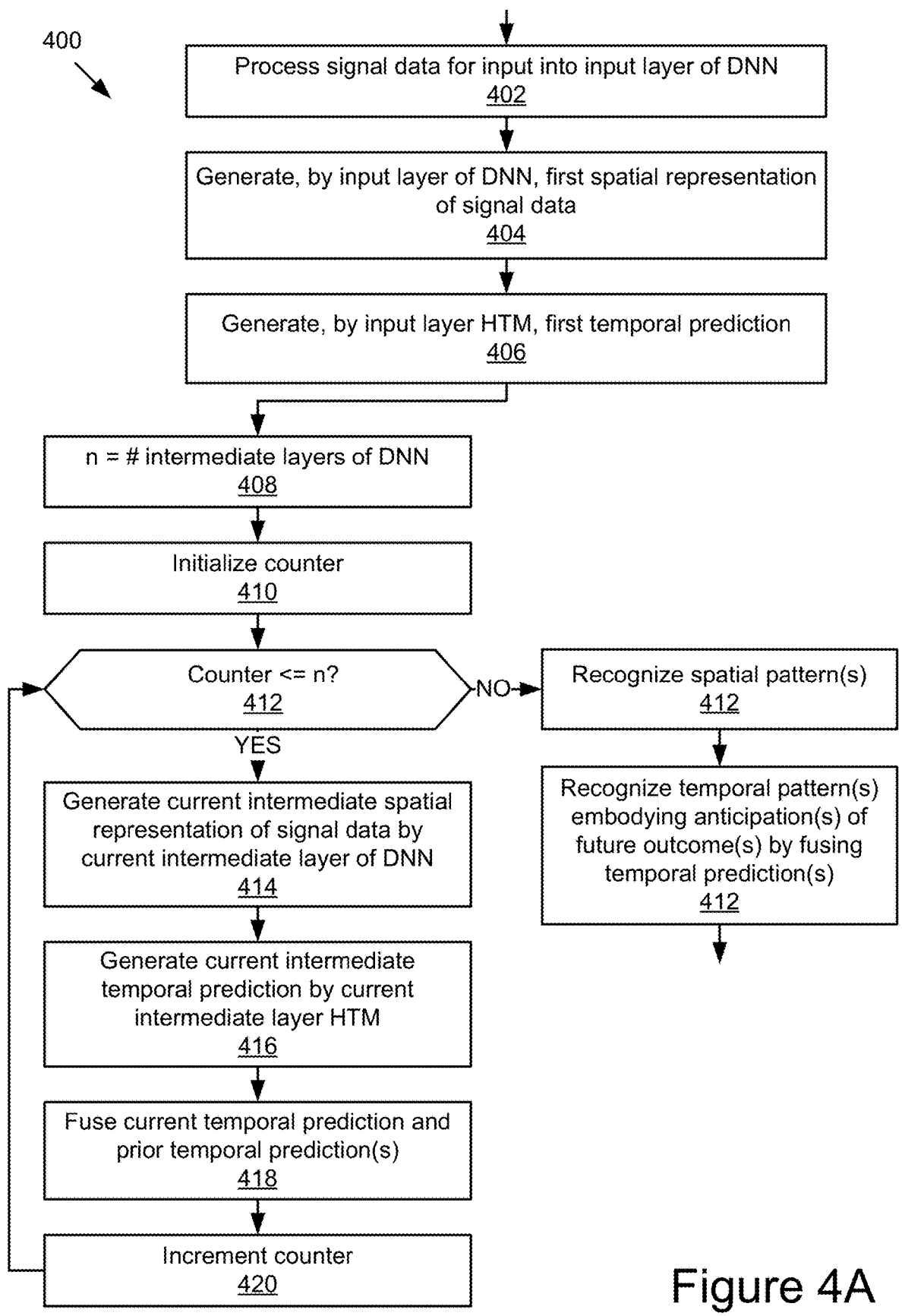
FIG. 4A is a flowchart of an example method for modeling driver behavior.
Figure 4B:
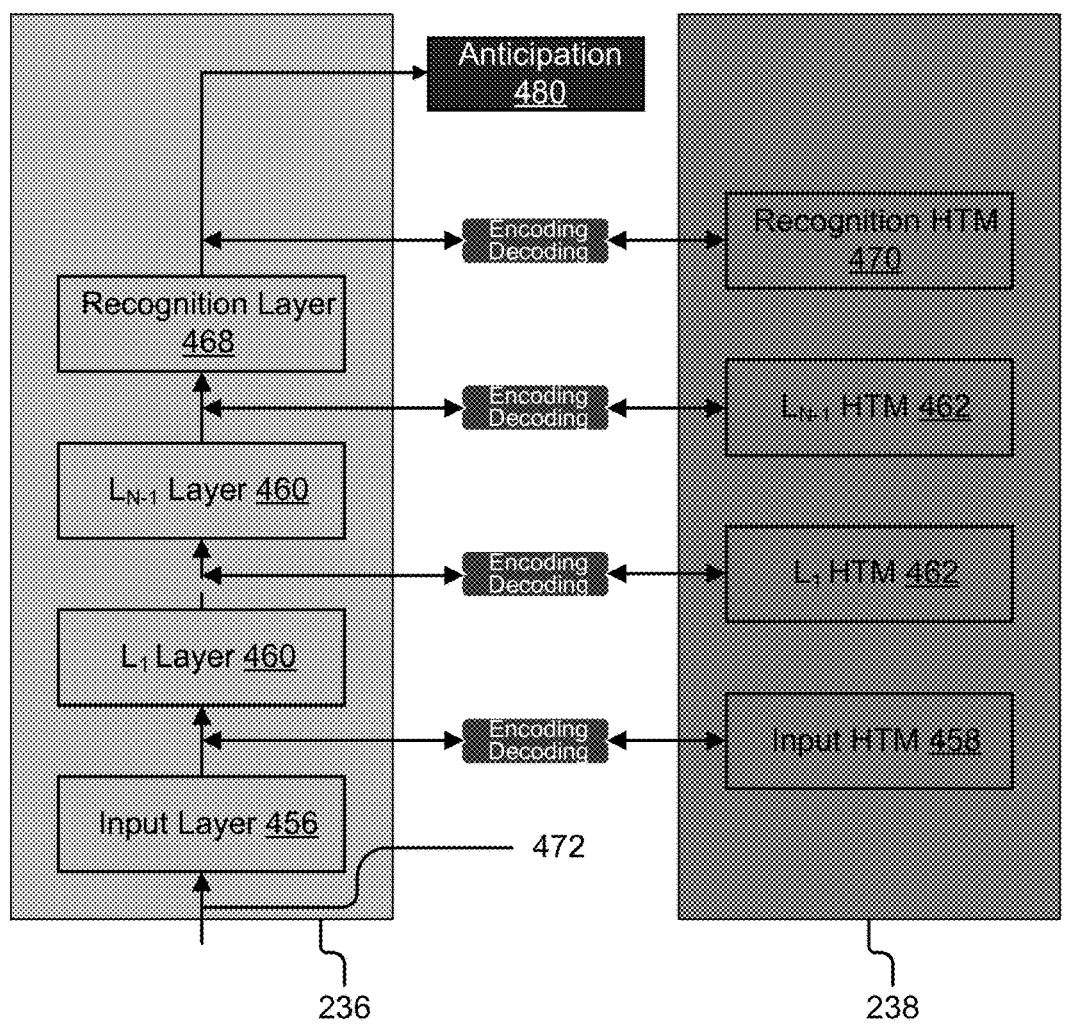
FIG. 4B is a block diagram of an example configuration of a modeler using a single input modality.

FIG. 4A is a flowchart of an example method 400 for modeling driver behavior and FIG. 4B is a block diagram of an example configuration 450 of the modeler 234 modeling behavior using a single input modality. A single modality may be represented by a set of one or more sensors 103 providing a type of sensor data, such as the types discussed elsewhere herein. Multiple modalities may be represented by distinct sets of one or more sensors 103. Each modality provides a certain type of sensor data. In a multi-modal construct, the modeler 234 may uniquely combine signal data from a plurality of different signal sources, as discussed in further detail below, such as FIG. 5.

As illustrated in FIG. 4B, the DNN 236 may include an input layer 456, one or more hidden layers, such as $L_1$ layer 460 through $L_{N-1}$ layer 464, and recognition layer 468. For each layer of the DNN 236, the modeler 234 includes associated HTMs 238, such as the input layer HTM 458, $L_1$ layer HTM 462 through $L_{N-1}$ layer HTM 466, and recognition layer HTM 470.

To process the input signal data, the modeler 234 may first route the input data to the input layer 456 of the DNN 236. The input layer 456 of the DNN 236 may then transform the input data, as discussed elsewhere herein, and the modeler 236 may route the transformed data to the input layer HTM 458, as input, for temporal pattern processing and/or storage. The output of the input HTM 458 may be routed to the next layer of the DNN 236, the L1 layer 460, which may further transform the data and provide its output to a corresponding layer HTM for temporal pattern processing, L1 layer HTM 462. This process may be repeated for as many layers that exist in the DNN 236 using the corresponding HTMs (e.g., LN−1 layer(s) 460 and LN−1 layers HTM 462). After these intermediate layers, the modeler 234 may route the input from preceding layer components (e.g., layer(s) 460 and HTM(s) 462) to the DNN recognition layer 468, and route the output of the DNN recognition layer 468 to the recognition HTM 470. The pattern(s) recognized by these elements 468 and/or 470 are then routed to the anticipation generator 238, which outputs an anticipation 480 based thereon.

Referring now to FIG. 4A, in block 402, the signal data processor 232 may, in some cases, process the signal data for input into the input layer 456 of the DNN 236, as discussed elsewhere herein. In block 404, the input layer of the DNN may generate a first spatial representation of the signal data. In block 406, the input layer HTM 406 may generate a first temporal prediction using the first spatial representation of the signal data. The input layer HTM 406 may be coupled to the DNN input layer 456 to receive data reflecting the first spatial representation. In block 408, the modeler 234 may determine the number of intermediate layers of the DNN (e.g., set variable n=the number of layers), and initialize a counter in block 410.

In block 412, the modeler 234 determines whether all of the intermediate layers have been processed (e.g., by comparing n to the current value of the counter). If any further intermediate layers require processing, the modeler 234 determines the next intermediate layer to be the current layer and generates, in block 414, a current intermediate spatial representation of the signal data by the current intermediate layer of the DNN, and in block 416, generates a current intermediate temporal prediction by the current intermediate layer HTM. In block 418, the current intermediate layer HTM fuses the current temporal prediction with one or more prior temporal predictions(s) processed during previous iterations of blocks 406 and/or 416. The modeler 234 then increments the counter and proceeds to block 412 to determine whether any additional intermediate layers require processing. Upon determining, in block 412, that processing by the intermediate layers is complete, the DNN recognition layer 468 recognizes spatial pattern(s) in block 412 and recognizes temporal pattern(s) embodying anticipation(s) of future outcome(s) by fusing a current and one or more prior temporal predictions (e.g., such as those determined in blocks 406, 416, and/or 418).

In some embodiments, the layers 456, 460, and/or 468 of the DNN 236 may be hidden layers. Additionally or alternatively, the layers 460 and/or 468 and corresponding HTMs 462, and/or 470 may produce a series of output data through hierarchical layer-by-layer processing of each layer's output data. The output data generated in each hidden layer of the DNN 236 and corresponding HTM 238 may represent continually refined spatial and temporal features (representations and predictions) that are eventually recognized as patterns.

In some cases, the more and deeper the layers, the more accurately features can be recognized. Configurations (e.g., number of levels, aggressiveness of processing) can be optimized to processing constraints of the implementations to avoid perceptible lag by the computing system. Advantageously, correlations determined in a training process of the DNN 236, may reliably correlate a user's action with time-varying input data or original signal data at time t. Further, in some cases, the modeler 234 can be configured (e.g., initially, ongoing using learning) on a user-by-user basis to provide customized anticipations.

In some embodiments, based on the recognized intermediate spatial representations at time t by the layers 460 of the DNN 236, the corresponding HTMs 462 may each generate an intermediate temporal prediction representing some recognized temporal correlations of user's action between a time t and a time t+1. Based on the recognized temporal correlations of user's action for the moments t and t+1, and the recognized user's action at time t by the DNN 236, each HTM 462 may make one or more projections estimating the user's future action at time t+1. In some embodiments, to predict user's future action with high confidence, each HTM 462 may further fuse all previous and current projections up to, and in some cases including, that level to remove likely anomalous projections, as discussed further elsewhere herein. This repeated layer-by-layer fusion process may, in some cases, increase the accuracy of the anticipation 480 to satisfy a predetermined threshold (e.g., confidence level). The predetermined threshold may reflect a level determined by a stakeholder to be sufficient to provide feedback, such as a warning, corrective action, etc.

As discussed, the modeler 234 can recognize spatial and temporal patterns in the received input signal data based on the generated spatial representations and temporal predictions. In some embodiments, the recognition layer 468 of the DNN 236 may recognize a spatial pattern in the signal data based on the output from $L_{N-1}$ layer 460 of the DNN 236 and/or the recognition layer LN-1 TM 462 of the HTM 238, and/or outputs by prior DNN 236 and HTM 238 layers, as discussed elsewhere herein. Further, the recognition layer HTM 470 may recognize a temporal pattern in the signal data based on the spatial representation output from the recognition layer 468 and/or outputs by prior DNN 236 and/or HTM 238 layers, as discussed elsewhere herein. In some instances, the recognized spatial pattern may represent a user's action at time t correlated with the original signal data, and the recognized temporal pattern may include user's future action at time t+1 correlated with user's action at time t.

The anticipation 480 may reflect an effective prediction of a future outcome, such as a user's action at time t+1, by the recognition layer HTM 470. In some embodiments, the modeler 234 may take into consideration external constraints when generating the anticipation 480. A non-limiting example of external constraints are traffic rules. For instance, without considering the external constraints, the modeler 234 may produce an anticipation predicting in 1 second the driver will turn the vehicle right at an intersection. However, when considering a traffic rule of "no right turn," the anticipation may predict that the driver of the vehicle will continue through the intersection.

Referring again to FIG. 4B, future outcomes may be anticipated by the modeler 234 based on the correlations between input data and a set of outcomes. The outcomes may be learned by the modeler 234. For instance, an initial set of outcomes may learned by the modeler 234 during a training process, and additional outcomes may be further iteratively learned during continued operation.

As a further example, the modeler 234 may recognize a user's action $Y(t)=(y_1, y_2, y_3, \ldots, y_t)$ from a temporal input sequence $X(t)=(x_1, x_2, \ldots, x_t)$ based on nonlinear transformations in each layer of the DNN 236, and the correlations of the input signal data X and the output user's action Y, i.e. $\{(x_1, y_1), (x_2, y_2), \ldots, (x_n, y_n)\}$.

In some embodiments, one or more of the DNN 236 layers may each comprise a plurality of nodes, and each node in that layer may be connected to one or more nodes in the immediately adjacent deeper layer. Nonlinear transformations performed in each layer of the DNN 236 may include computing a weighted sum of the inputs from nodes of the previous layer and processing the computed data using a nonlinear function (performing a non-linear transformation of the data). The transformation(s) performed at each layer may vary based on the purpose and configuration of the modeler 234. For example, the DNN 236 may include a convolutional neural network layer at layer i, and the function for nonlinear operation in that layer may be performed using the following equation:

$$f_i(x) = NN(W_i x + b_i),$$

where $W_i$ and $b_i$ are the parameters for the layer i, which may be determined during the training process. NN(.) function is a neuron network function, which may vary in each layer depending on the input signal data and the features to be extracted or learned in that layer. For example, NN(.) may be a sigmoid function, such as $sigmoid(x)=1/[1+exp(-x)]$, a rectified linear unit (ReLu) function, such as $ReLu(x)=\max(0,x)$, a tanh function, or other suitable functions. W*x in NN(.) the above equation may be a valid convolution operation between W and x, matrix multiplication, or other suitable operation.

The NN(.) function provides a nonlinear transformation output of each deeper DNN layer, which results in a higher level and more invariant representation of the input signal data compared to the previous layer of the DNN 236. For example, in some embodiments, an output from a layer i is a more invariant representation of a layer i−1 after nonlinear transformation:

$$A^i(t) = f_i(A^{i-1}(t))$$

where $i=1, 2, \ldots, N$. $A^0(t)=X(t)$ represents the input signal data. The output from the recognition layer $A^N(t)$, which equals Y(t), represents the final recognition of the correlated user's action Y(t) after the series of nonlinear transformations of X(t), for instance, by:

$$Y(t) = f_N(f_{N-1}(\ldots f_0(X(t))\ldots)),$$

where $f_0(x)=x$ and N is the number of layers in the DNN 236.

As discussed, output data (A$^i$(t)) from each layer of the DNN 236 may be passed into the corresponding HTM 238 for a temporal pattern processing. The HTMs 238 are responsible for exploiting temporal correlations within Y(t) to project a future outcome (e.g., user's future action) at time t+1. A given HTM 238 may predict a future outcome at time t+1 based on the spatial representation(s) at time t.

In some embodiments, the spatial pattern recognized by the recognition layer 468 of the DNN 236 may be used by the recognition layer HTM 470 for temporal correlation recognition within Y(t). However, in some embodiments, to increase the accuracy of temporal pattern recognition by the recognition layer HTM 470, the DNN 236 may also pass the input layer 456 output A$^0$(t), and output A$^i$(t) to A$^{N-1}$(t) from the intermediate layer(s) 460 corresponding HTMs 458 and 462 associated with those layers.

For instance, for a layer i HTM, the DNN 236 may pass an output data A$^i$(t) from the corresponding DNN 236 layer to that layer i HTM 238. The layer i HTM 238 may then generate a temporal prediction, representing a determined temporal correlation (e.g., provisionally recognized pattern) between time t and t+1 for an outcome. Based on the correlation, the level i of the HTM 238 may generate a temporal prediction of the outcome, represented by Ahat$^{i,i}$(t+1) at time t+1.

Corresponding temporal predictions may be generated by each layer HTM (e.g., 458, 462, etc.). A given temporal predicitnos may be fused with temporal prediction(s) generated before it. For instance, in a given layer, prediction(s) generated in that layer may be fused with prediction(s) generated from previous HTM layers. The fused prediction may predict the outcome(s) at time t+1 with increased confidence due to a removal of anomalous features in the signal data, and/or introduced by one or more layers of the modeler 234 during processing. In embodiments having multiple fusion operations, the accuracy of the recognition performed by the recognition layer components (e.g., 468 and/or 470) may be greatly improved, which increases the accuracy of any counter measures taken responsive to the generated anticipation.

The following notation reflects fusion of a set of temporal predictions: Ahat$^i$(t+1)=G$_i$(Ahat$^{i,i}$(t+1), Ahat$^{i,i-1}$(t+1), ..., Ahat$^{i,0}$(t+1)). In this notation, Ahat$^{i,j}$(t+1) represents the temporal predictions from HTM layer j projected till layer i, and G$_i$(.) is a fusion operation in the layer i HTM. For example, at i=3, Ahat3(t+1), the effective future prediction equals a fusion of the projections up to and/or including layer 3 (e.g., Ahat$^3$(t+1)=G$^3$(Ahat$^{3,3}$(t+1), Ahat$^{3,2}$(t+1), Ahat$^{3,1}$(t+1), Ahat$^{3,0}$(t+1)). AS a further example, for the recognition layer HTM 470, the notation may be Ahat$^N$(t+1)=G$^N$(Ahat$^{N,N}$(t+1), Ahat$^{N,N-1}$(t+1), ..., Ahat$^{N,0}$(t+1)). In the above embodiments, Ahat$^N$(t+1) can provide an effective recognition in the next time stamp. Advantageously, using these techniques, the modeler 234 can realize both semantic and episodic memories, which improves event recall, processing accuracy, and processing speed. In particular, the coupling of the HTMs 238 and DNN layers in the modeler 234, and the operations of those elements, can limited the need for extra memory storage to store driving data, as the modeler 234 is capable of memorizing and recalling the driving data (e.g., historical outcomes (e.g., driver actions, etc.).

Figure 8:
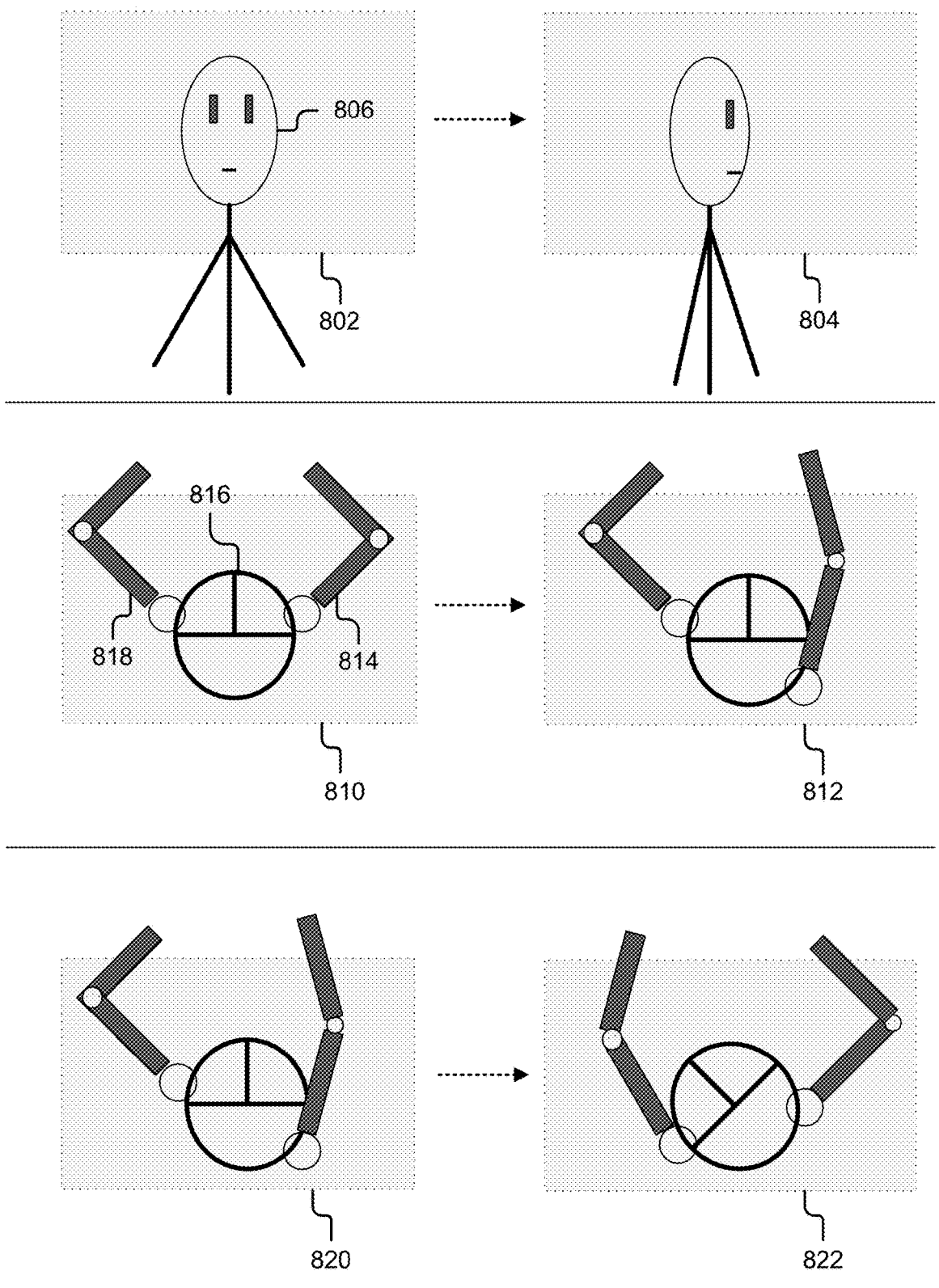
FIG. 8 illustrates an example of modeling driver behavior using a single input modality.

FIG. 8 illustrates an example 800 of modeling driver behavior using a single input modality. As illustrated in the figure, X(t) may represent time-varying image data tracking head 806 motions of a user 115, as shown by the images 802 and 804. Y(t) may represent user's action correlated with X(t), such as the movements of user's hands 814 and 818 on a steering wheel 816, as shown in the images 810 and 812. In a previous training, the modeler 234 may learn a correlation between the user's head motions (as shown in the images 802-804) and user's hand movements on the wheel 816 (as shown in the images 810 -812), which may be reflected by the weights of the DNN 236 determined in the training. The DNN 236 may thus have a capacity to recognize a user's hand movements, based on the time-varying image data for monitoring head motions of the user 115. For instance, the DNN 236 may recognize the user 115 is moving his/her left arm 814 forward, based on the time-varying input image data of 802 and 804. The recognized Y(t) by the DNN 236 may be passed to the HTM 238. The HTM 238 may then recognize a correlation of user's action represented by the images 810-812 at time t and the image 822 a time t+1. The correlation may be recognized by the HTM 238 based on a memorized pattern of user's action 810-812-822 from a previous training and/or method iteration. The HTM 238 may then generate an effective prediction of user's action at time t+1, as the image 822 shows.

In some embodiments, the predicted user's action may not reflect an actual action that a user 115 intends to take. The predicted action by the HTM 238 is an expected action taken by the user 115 at time t+1 based on the input signal data received by the modeler 234 at time t. In some embodiments, the predicted action Ahat$^N$(t+1) may not be exactly the same as actual action A$^N$(t+1) taken by the user 115 at time t+1, and thus a prediction error may occur. The prediction error may be represented by the following equation:

$$e^i(t+1)=A\text{hat}^i(t+1)-A^i(t+1),$$

which may be used to train the HTM network. This equation computes the difference between the predicted action and the actual action at the future timestamp. Further, e$^N$(t+1) may be determined and used to train the DNN network using a backpropagation algorithm. In some embodiments, the prediction error may be traced to some levels of the HTM 238.

In some embodiments, the prediction errors may be noticed by a user 115 of a moving platform 101 after an anticipation is presented to the user 115. The user 115 may sent a feedback indicating a prediction error through an input device 221, and the modeler 234 may further adapt various aspects of the DNN 236 and the HTMs 238 based on the feedback. In further embodiments, the prediction error may be automatically detected by the system 100 if the user 115 does not operate the moving platform 101 as expected. Other variations are also possible and contemplated.

The modeler 234 may include any necessary architectures, algorithms, configurations, etc., to provide for training and optimization, which can minimize prediction errors. For instance, in an example configuration, a backpropagation algorithm (BPA) may be used for training the DNN network, and a cortical learning algorithm (CLA) may be used to train the HTM network, which can be more efficient that other approaches, such as backpropagation through time (BPTT) in some instances.

In some embodiments, the BPA may minimize prediction errors in the DNN 236 by updating weights in the algorithms used by the DNN 236. The BPA may update a weight in a layer of the DNN 236 according to the following. The BPA may first determine a gradient of the weight by determining the output difference and input data. The BPA may then subtract a percentage of the gradient from the weight and get an updated weight. The BPA may then determine whether the updated weight may minimize the prediction error to a pre-determined level. If not, a new round of weight update may be performed again by subtracting another percentage of the gradient from the weight, which may be repeated until the prediction error reaches a pre-determined level. The percentage applied in each round may affect the speed and quality of training or learning process. The greater the percentage, the faster the training process lasts. The lower the percentage, the more accurate the training is. After the updated weight reaches a pre-determined level in each layer, the weight may then be saved for use. By updating weights in different layers of the DNN 236, the DNN 236 may be adapted to minimize prediction errors in future.

In some embodiments, the CLA may minimize prediction errors by learning continuously from each new input pattern. Following the CLA, the HTM 238 may attempt to match a streams of inputs to previously learned temporal sequence of dynamic change of distribution. This allows each HTM layer to continually predict the likely continuation of the memorized temporal sequence of dynamic change of distribution of the states of the cells in the HTM 238. Therefore, a continuous training to learn new input patterns in the HTM 238 may minimize prediction errors by the HTM 238.

Figure 9A:
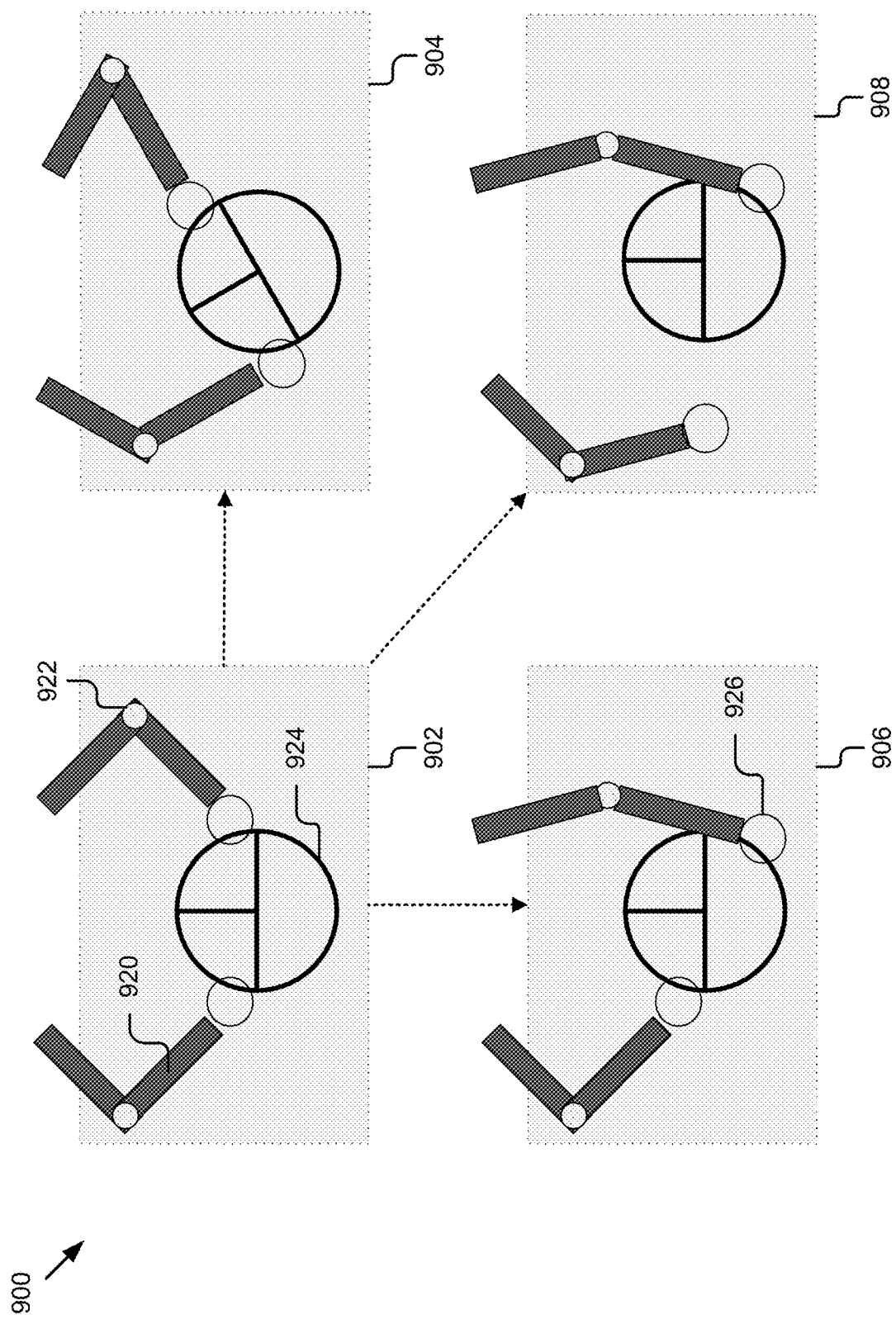
FIGS. 9A-B illustrate examples of factors affecting driver behavior modeling.
Figure 9B:
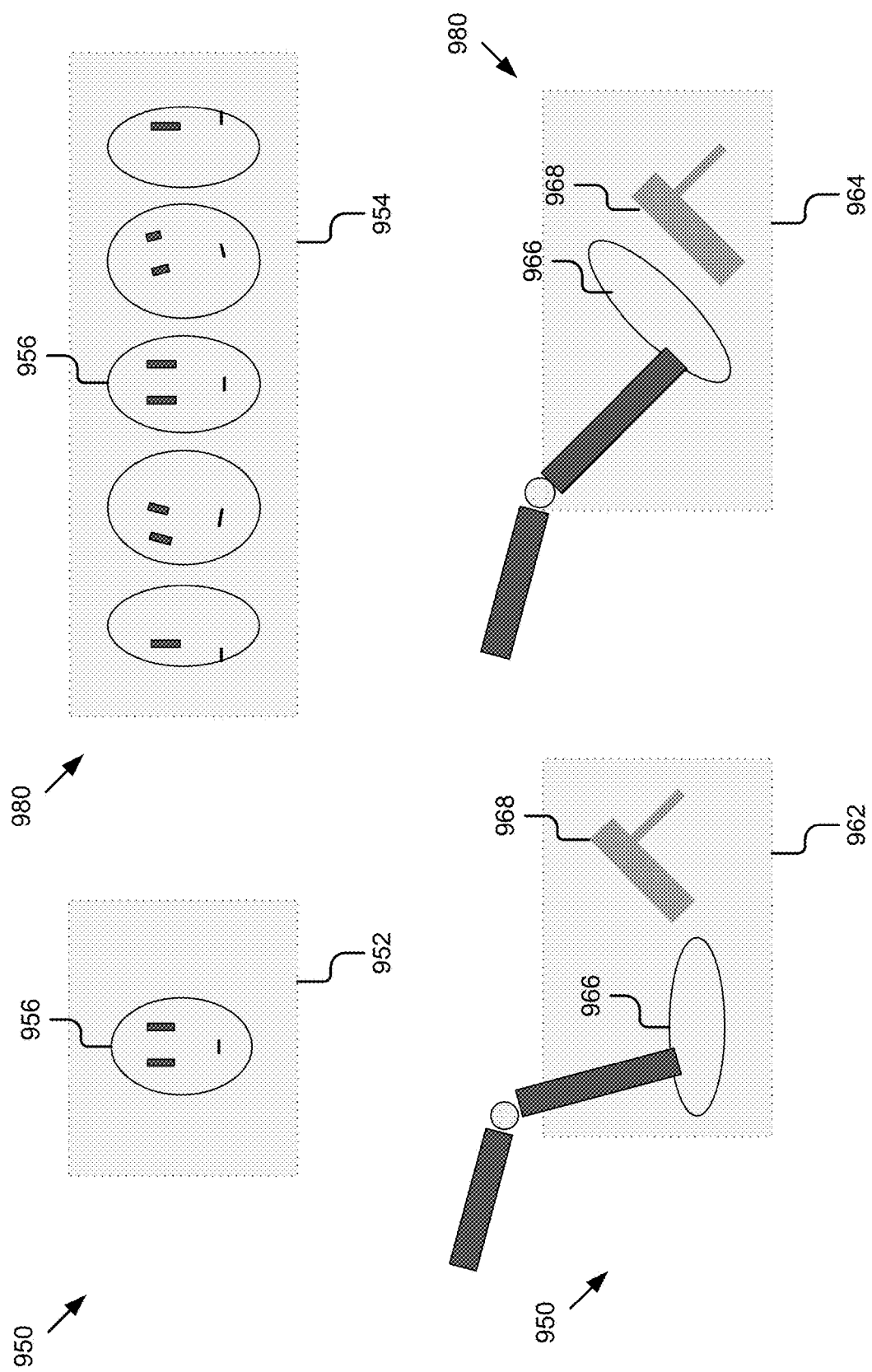

FIGS. 9A-9B illustrate examples of factors affecting driver behavior modeling. FIG. 9A illustrates an example of different steering habits 900 of different drivers. Image 902 shows an example of a general posture for a driver operating a steering pedal when a vehicle is moving forward. Both the left arm 922 and the right arm 920 of the driver are equally positioned (e.g., hands at 10 and 2) on the steering wheel 924. Images 904, 906, and 908 show different driver patterns in operating the steering wheel when making a left turn. For instance, in the image 904, a driver may turn the vehicle left by moving his/her arms to rotate the steering pedal 924 without repositioning his/her hands on the steering wheel 924. In contrast, in images 906 and 908, the driver may reposition his/her hand(s) prior to turning the wheel. For instance, in image 906, a driver may first move his/her left hand 926 forward around the steering wheel 924, and then pull his/her left arm 922 back in preparation to rotate the steering wheel. In image 908, a driver may remove a hand and/or reposition a hand on the steering wheel 924.

In some embodiments, the modeler 234 may be trained to recognize the patterns shown in FIG. 8A, such as images 906 and 908, and may be able to predict a future left turn based on the patterns. Further, once trained, through subsequent (e.g., continuous) iterations may update the temporal sequences memorized in the cells in the HTM 238 and/or update the weights in the DNN 236. The modeler 234 may then be adapted to different user habits to accurately anticipate future outcomes, such as driver behavior.

FIG. 9B depicts an example showing the effect environment familiarity may have on a user's driving behavior. Images 952 and 962 may capture a user's activity in a familiar environment 950. In this environment 950, the user may keep his/her head 956 relatively still, and his/her right foot 966 may be at rest away from the brake 968.

In contrast, images 954 and 964 may capture a user's activity in an unfamiliar environment 980. For instance, as shown, the user may keep moving his/her head 956 around to check the surrounding environment (e.g., road signals, street name, exits, etc.), as illustrated in the image data 954. Additionally or alternatively, the user may move his/her right foot 966 closer to the brake pedal 968, or place his/her right foot above the brake pedal 968, as shown in image data 964. This foot gesture may indicate an immediate braking action in a familiar environment, and the the head movement may similarly indicate a left or right turn in an unfamiliar environment 980.

The modeler 234 may correlate driver patterns with environment familiarity, such as the patterns and familiarity discussed above, when determining patterns from signal data. Additionally, during a training process, the algorithms of modeler 234 may be adapted to consider the patterns in context, such as familiar and unfamiliar environments.

While a single input modality may perform reasonably well in predicting user's future action, there might be necessary to consider multiple signal data to improve prediction accuracy since every risky driver behavior may cause severe damage. Multiple modalities may incorporate and combine multiple input signal data thus improve the accuracy and efficiency in predicting user's future action.

Figure 5:
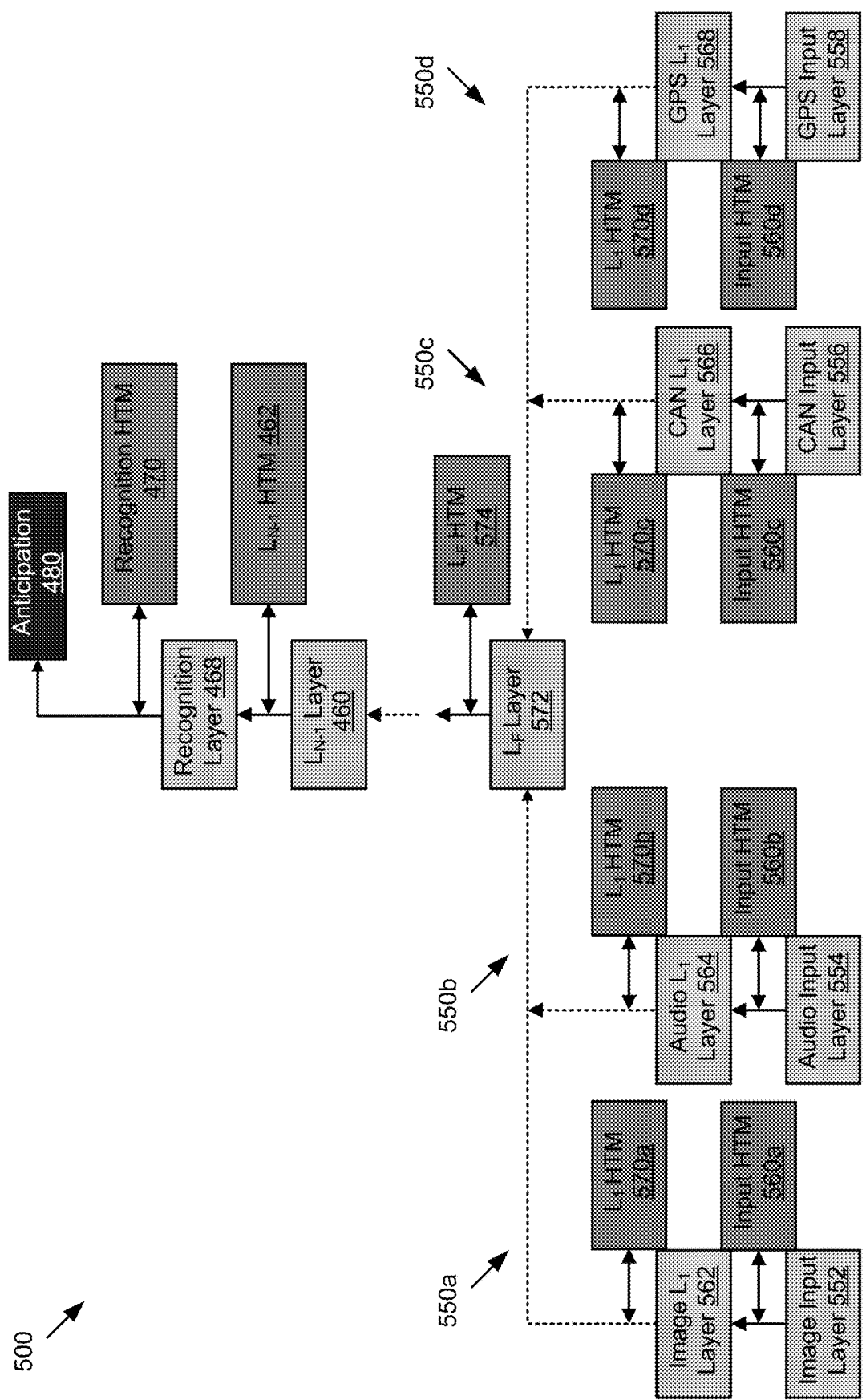
FIG. 5 is a block diagram of an example configuration of a modeler using multiple modalities.

FIG. 5 is a block diagram of an example configuration 500 of a modeler 234 modeling driver behavior using multiple modalities. The number of modalities may be user-configured and adapted to suit different implementations. In this example, four different modalities are used, although it should be understood that fewer or additional modalities may be used, depending on requirements and design constraints. These four different modalities provide image data, audio data, GPS data, and CAN data, although it should be understood that other data types and data type combinations are also possible and contemplated.

As shown in FIG. 5, the input layer configuration of the modeler 234 may be expanded to accommodate the multiple modalities. In particular, for each modality, the modeler 234 may include an image input DNN layer 552 and, in some cases an image L1 DNN layer 562. Each of these layers 552 and 562 may have a corresponding HTM coupled to it, such as the image input layer HTM 560a and the L1 layer HTM 570a. Similarly, for each of the other modalities, the modeler 234 may include corresponding components, such as: the audio input DNN layer 554, the audio L1 DNN layer 564, which are respectively coupled to the corresponding the input layer HTM 560b and the L1 layer HTM 570b; the CAN input DNN layer 556, the CAN L1 DNN layer 566, which are respectively coupled to the corresponding the input layer HTM 560c and the L1 layer HTM 570c; and the GPS input DNN layer 558, the GPS L1 DNN layer 568, which are respectively coupled to the corresponding the input layer HTM 560d and the L1 layer HTM 570d. Each branch 550a, 550b, 550c, and 550d of system 500, is similar in form, structure, and operation, for their respective signal data, to the input and L1 layers (e.g., 456, 458, L1 460, and L1 462) in FIG. 4B, so those aspects will not be repeated here.

The output from each branch 550a, 550b, 550c, and 550d may be routed by the modeler 234 to DNN $L_F$ layer 572. The layer 572 may fuse aspects of the outputs and generate a spatial representation based on the fused data, which it may pass to the $L_F$ layer HTM 574. $L_F$ layer HTM 574 may similarly fuse aspects of the outputs, such as the temporal predictions produced by the HTMs of the different branches 550a-550d, in a manner similar to that discussed elsewhere herein. The subsequent processing by the remaining layers 460, 462, 468, and 470 of the modeler 234, and the generation of the anticipation 480, have already been described, and will not be repeated here.

To further illustrate, a computing system may include set(s) of sensor(s) that provide sensor data, non-transitory computer memor(ies) 215 for storing and providing access to data, and computer processor(s) 213 coupled to the non-transitory computer memories to store and receive data.

The system may further include a DNN 236 storable by the one or more non-transitory computer memories 215 and executable by the computer processor(s) 213.

The DNN 236 may include a plurality of hierarchical layers. For instance, the DNN 236 may include input layer(s) (e.g., 456, 552, 554, 556, and/or 558, etc.), intermediate layer(s) (e.g., 562, 564, 566, 568, 572, and/or 460, etc.), and a recognition layer (e.g., 468, etc.). The input layer(s) of the DNN 236 receive sensor data from the sensor(s) 103 directly or indirectly.

The system may include a plurality of HTMs storable by the one or more non-transitory computer memories 215 and executable by the computer processor(s) 213. The HTMs 238 include input layer HTM(s) (e.g., 458, 560a, 560b, 560c, and/or 560d, etc.), intermediate layer HTM(s) (e.g., 462, 570a, 570b, 570c, 570d, and/or 574, etc.), and a recognition layer HTM (e.g., 470, etc.). The input layer HTM(s) are respectively coupled to the input layer(s) of the DNN 236 and executable by the computer processor(s) 213 to receive corresponding spatial representation(s) of the signal data. The input layer HTM(s) are executable by the computer processor(s) 213 to generate input layer temporal prediction(s) using the spatial representation(s) of the signal data, which may in some cases be fused in an intermediate layer.

The intermediate layer HTM(s) are respectively coupled to the intermediate layer(s) of the DNN 236 and executable by the computer processor(s) 213 to receive intermediate layer spatial representation(s) from the one or more intermediate layers of the DNN 236. The intermediate layer HTM(s) are executable by the computer processor(s) 213 to generate intermediate layer temporal prediction(s) based on the intermediate layer spatial representation(s).

The recognition layer HTM is coupled to the recognition layer of the DNN and executable by the computer processor(s) 213 to receive a recognition layer spatial representation from the recognition layer of the DNN 236. The recognition layer HTM is executable by the computer processor(s) 213 to generate a recognition layer temporal prediction based on the recognition layer spatial representation. The recognition layer HTM is further executable by the computer processor(s) 213 to generate an anticipation of a future outcome by recognizing a temporal pattern based on the input layer temporal prediction, the one or more intermediate layer temporal predictions, and the recognition layer temporal prediction.

Figure 10A:
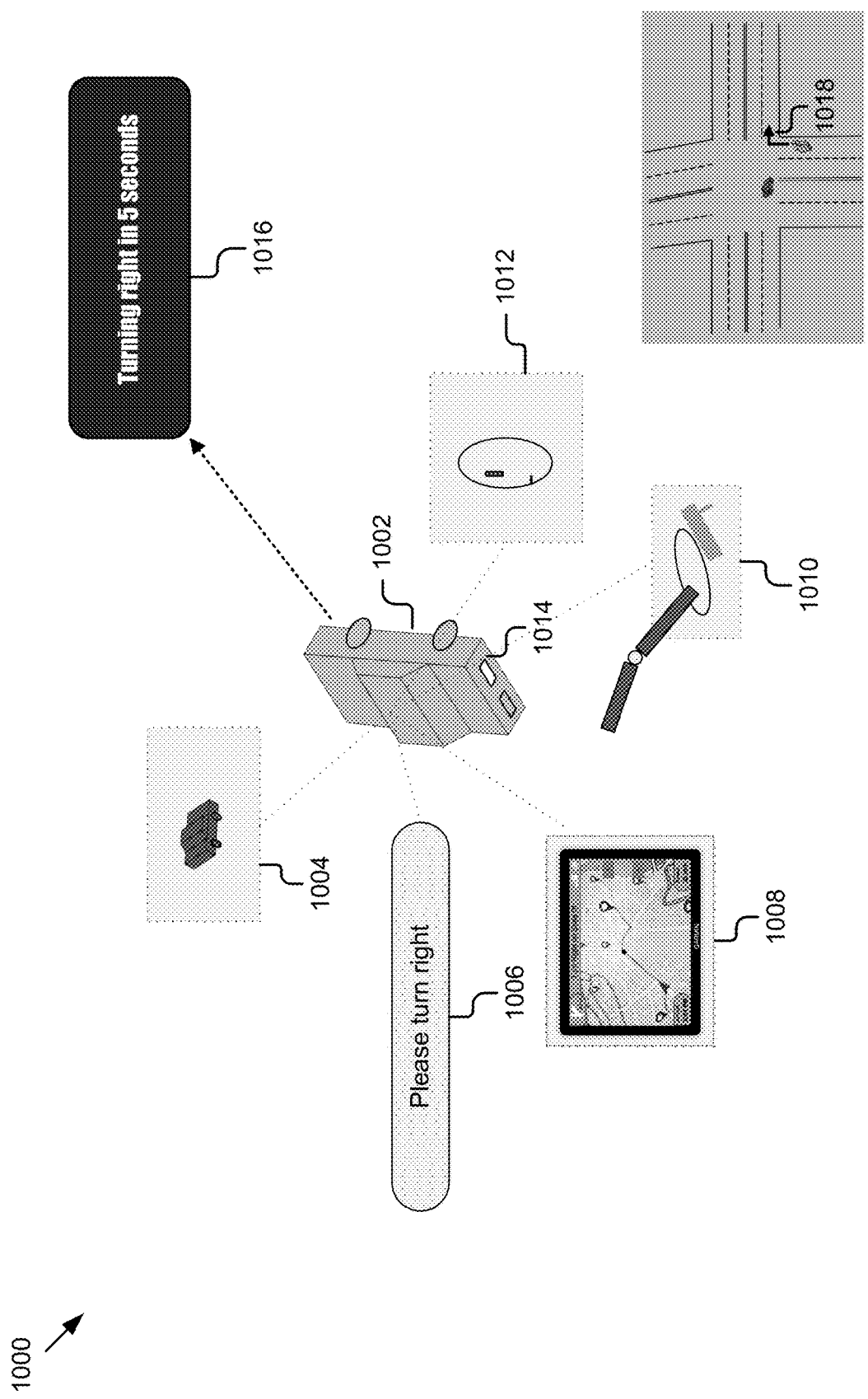
FIGS. 10A and 10B illustrate examples of generating and implementing anticipations.
Figure 10B:
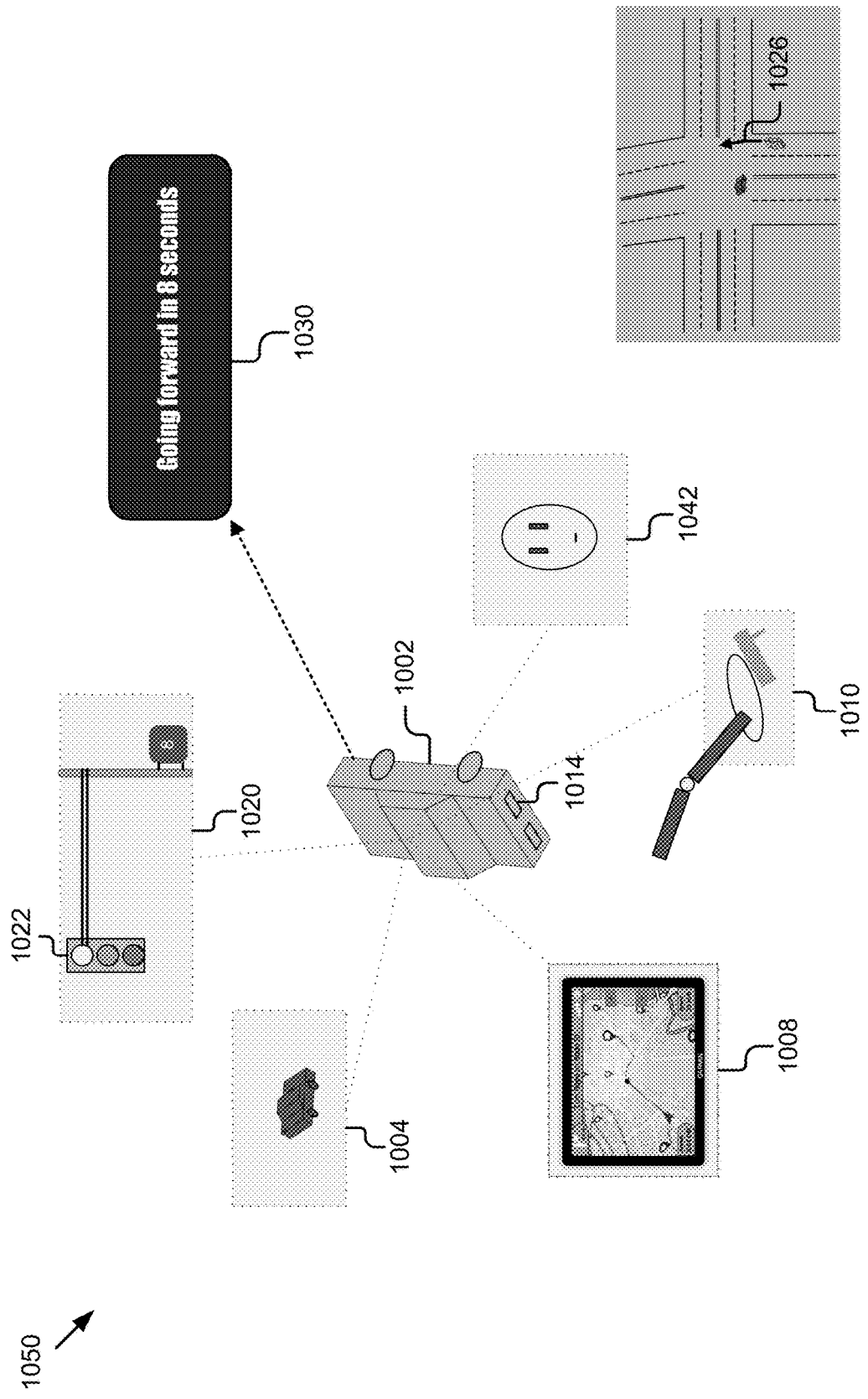

FIGS. 10A and 10B illustrate examples of generating and implementing anticipations. In FIG. 10A, a vehicle 1002 is approaching an intersection. Sets of sensors 103 may capture multiple sets of signal data while the vehicle 1002 is approaching the intersection. The signal data may include image data 1004 showing another vehicle is moving east in the intersection, GPS data 1006 and 1008 may reflecting the vehicle's route relative to the vehicle's position, image data 1010 capturing right foot of a user 115 on the brake pedal of the vehicle, image data 1012 capturing left road-check of the user 115 by moving his/her head, and CAN data 1014 showing the right indicator of the vehicle 1002 is active. The consideration of multiple modalities by the modeler 234, such as the foregoing ones, may improve prediction accuracy. For instance, without the image data 1004, the modeler 234 may, using the methods discussed herein, generate an anticipation indicating the user 115 will make a right turn at 4 seconds. In contrast, with the image data 1004, the modeler 232 may generate an anticipation that the user 115 may make a right turn in 5 seconds, which is determined based on the time required by the vehicle in the image data 1004 to pass the intersection, which may be learned through a training process. The navigation application 107 may implement an action based on the anticipation, such as adapt the suspension of the vehicle for the turn at the predicted time, provide more accurate navigation instructions (e.g., turn by turn instructions), etc.

In FIG. 10B, the vehicle 1002 is approaching the intersection. Sets of sensors 103 may capture multiple sets of signal data while the vehicle 1002 is approaching the intersection. The signal data may include image data 1004 showing another vehicle is moving east in the intersection, GPS data 1008 showing the route directions, image data 1010 capturing right foot of the user 115 on the brake pedal, image data 1042 capturing the user looking ahead, and image data 1020 showing a red light 1022. Based on previous training and learning performed during prior iterations, the modeler 234 may generate an anticipation that the user 115 will start to move forward at a certain based on the received multiple set of the signal data. The time may be determined based on the amount of time it has taken in prior iterations or training for the red light to turn. The navigation application 107 may implement actions in association with the anticipation, such as start the vehicle and/or various systems, adapt the suspension, shift gears, provide updated navigation instructions, etc.

Figure 6:
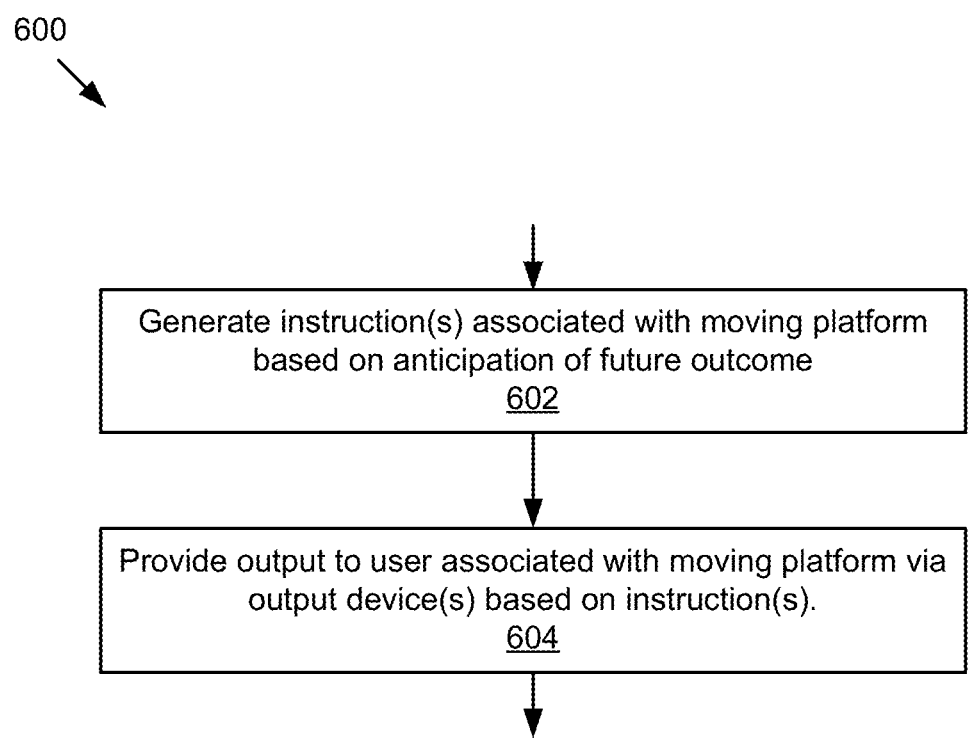
FIG. 6 is a flowchart of an example method for generating and outputting instructions(s) based on an anticipation.

FIG. 6 is a flow chart of an example method 600 for generating and outputting instructions(s) based on an anticipation. In block 602, the navigation application 107, responsive to receiving anticipation(s) from the modeler 234, may generate instruction(s) associated with the moving platform based on the anticipation(s) of future outcome(s), and in block 604, the navigation application 107 may provide output to the user associated with the moving platform via output device(s) based on the instruction(s). An example instruction may be an instruction to provide a notification to the user, and the navigation application 107 may output the notification, at a future anticipated time (e.g., t+1), via audio, visual, and/or tactile output devices, such as speakers, screens, and vibrator motors.

As a further example, the generated anticipation may anticipate that the user, a driver, will change to a left lane at time t+1 without noticing another vehicle in the left lane. The navigation application 107 may generate an instruction to audibly warn the driver of the danger, and the navigation application 107, based on the instruction, may output the warning "e.g., Be aware of the car in your left blind spot." Alternatively or additionally, the instruction may include a routing for controlling the steering to prevent the driver from changing lanes at the future time to prevent an accident from occurring. Other variations are also possible and contemplated.

The output by the navigation application 107 may in some cases reflect a compensation mechanism based on an anticipated outcome determined from the dynamic and static environments of the moving platform 101 as reflected by the sensor data captured by the sensor(s) 103. The output may be delivered to the user in a format perceptible by the user, as discussed elsewhere herein. Non-limiting examples include signaling the throttle, brakes, steering, indicators, transmission, instrumentation, or any other actuators or components, of a moving platform 101 to automatically manipulate the movement of and/or information provided by the moving platform 101. This advantageously increases the safety of the moving platform 101.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various embodiments are described as having particular hardware, software, and user interfaces. However, the present disclosure applies to any type of computing device that may receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein may take the form of an entirely hardware embodiment, an entirely software embodiment, or embodiments containing both hardware and software elements. For instance, the technology may be implemented in software, which includes but is not limited to firmware, resident software, microcode, etc. Furthermore, the technology may take the form of a computer program product accessible from a computer-usable or computer-readable medium providing program code for use by or in connection with a computer or any instruction execution system. For the purposes of this description, a computer-usable or computer readable medium may be any non-transitory storage apparatus that may contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure may be implemented as software, hardware, firmware, or any combination of the foregoing. Also, wherever a component, an example of which is a module, of the specification is implemented as software, the component may be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to embodiment in any specific programming language, or for any specific operating system or environment.

What is claimed is:

1. A computer-implemented method comprising:
receiving, at one or more computing devices, signal data from one or more sensors, the one or more computing devices being electronically communicatively coupled to the one or more sensors to receive the signal data;
inputting the signal data into an input layer of a deep neural network (DNN), the DNN including one or more layers;
generating, using the one or more layers of the DNN, one or more spatial representations of the signal data;
generating, using one or more hierarchical temporal memories (HTMs) respectively associated with the one or more layers of the DNNs, one or more temporal predictions by the DNN based on the one or more spatial representations; and
generating an anticipation of a future outcome by recognizing a temporal pattern based on the one or more temporal predictions.

2. The computer-implemented method of claim 1, wherein recognizing the temporal pattern includes fusing the one or more temporal predictions.

3. The computer-implemented method of claim 1, wherein
the DNN includes a plurality of hierarchical layers including an input layer and one or more intermediate layers,
the input layer is coupled to an input layer HTM,
the one or more intermediate layers are coupled to one or more intermediate layer HTMs,
generating the one or more spatial representations of the signal data and generating the one or more temporal predictions based on the one or more spatial representations further include
generating, by the input layer of the DNN, a first spatial representation of the signal data,
generating, by the input layer HTM, a first temporal prediction using the first spatial representation of the signal data,
receiving, by the one or more intermediate layers of the DNN, the first temporal prediction and the first spatial representation of the signal data,
generating, by the one or more intermediate layers of the DNN, one or more intermediate spatial representations of the signal data, and
generating, by the one or more intermediate layer HTMs, one or more intermediate temporal predictions based on the one or more intermediate spatial representations of the signal data, and
recognizing the temporal pattern includes fusing the first temporal prediction and the one or more intermediate temporal predictions.

4. The computer-implemented method of claim 3, wherein the one or more intermediate layers of the DNN are hidden layers.

5. The computer-implemented method of claim 3, wherein
the DNN includes a recognition layer coupled to a recognition layer HTM, and
fusing the first temporal prediction and the one or more intermediate temporal predictions includes
fusing, at each HTM of the one or more intermediate layer HTMs and at the recognition layer, a current temporal prediction generated by the HTM and one or more prior temporal predictions generated by one or more prior intermediate layer HTMs and the input layer HTM.

6. The computer-implemented method of claim 3, wherein
receiving, at the one or more computing devices, the signal data from the one or more sensors includes receiving, at the one or more computing devices, two or more sets of signal data from two or more sets of sensors, respectively,
the DNN includes two or more input layers, the two or more input layers being associated with two or more input layer HTMs, respectively,
the one or more intermediate layers include two or more first intermediate layers associated with the two or more input layers, respectively, and a second intermediate layer after the two or more first intermediate layers,
the one or more intermediate layer HTMs include two or more intermediate layer HTMs coupled to the two or more first intermediate layers of the DNN,
generating, by the input layer of the DNN, the first spatial representation of the signal data includes generating, by the two or more input layers of the DNN, two or more first spatial representations of the signal data,
generating, by the input layer HTM, the first temporal prediction using the first spatial representation of the signal data includes generating, by the two or more input layer HTMs, two or more first temporal predictions,
generating, by the one or more intermediate layers of the DNN, the one or more intermediate spatial representations of the signal data includes fusing the two or more first intermediate spatial representations,
generating, by the one or more intermediate layer HTMs, the one or more intermediate temporal predictions based on the one or more intermediate spatial representations of the signal data includes fusing the two or more first temporal predictions, and recognizing the temporal pattern includes fusing a present temporal prediction with the fused two or more first temporal predictions.

7. The computer-implemented method of claim 1, wherein generating, using the one or more layers of the DNN, the one or more spatial representations of the signal data includes performing, by a successive layer of the DNN, a nonlinear transformation of each spatial representation generated by one or more prior layers of the DNN.

8. The computer-implemented method of claim 1, further comprising:
recognizing a spatial pattern correlated with a present outcome based on the one or more spatial representations.

9. The computer-implemented method of claim 8, wherein the present outcome is a present human user action.

10. The computer-implemented method of claim 8, wherein the signal data includes data describing characteristics of a vehicle in motion at a present time.

11. The computer-implemented method of claim 1, wherein the future outcome is a predicted future human user action.

12. The computer-implemented method of claim 1, further comprising:
computing, at a future time, an HTM prediction error for using 1) the one or more temporal predictions; and 2) one or more spatial representations of sensor data received at the future time; and
training the HTM based on the HTM prediction error.

13. The computer-implemented method of claim 1, further comprising:
computing, at a future time, a DNN prediction error for a recognition layer of the DNN using 1) the anticipation; and 2) a recognized spatial pattern recognized by the recognition layer of the DNN based on the one or more spatial representations of sensor data received at a future time; and
training the DNN based on the DNN prediction error.

14. The computer-implemented method of claim 1, wherein the signal data includes one or more of image data, audio data, vehicle data from a Controlled Area Network (CAN) of the vehicle, electronic messaging data, and navigation data associated with a moving platform.

15. The computer-implemented method of claim 1, further comprising:
generating and providing one or more of an auditory instruction, a visual instruction, and a tactile instruction to the user via one or more output devices of a moving platform based on the anticipation of the outcome.

16. A computer system comprising:
one or more sensors providing sensor data;
one or more non-transitory computer memories for storing and providing access to data;
one or more computer processors coupled to the non-transitory computer memories to store and receive data;
a deep neural network (DNN) storable by the one or more non-transitory computer memories and executable by the one or more computer processors, the DNN including a plurality of hierarchical layers, the plurality of hierarchical layers including an input layer, one or more intermediate layers, and a recognition layer, the input layer of the DNN receiving sensor data from the one or more sensors; and
a plurality of hierarchical temporal memories (HTMs) storable by the one or more non-transitory computer memories and executable by the one or more computer processors, the HTMs including an input layer HTM, one or more intermediate layer HTMs, and a recognition layer HTM,
the input layer HTM being coupled to the input layer of the DNN and executable by the one or more computer processors to receive a spatial representation of the signal data,
the input layer HTM is executable by the one or more computer processors to generate an input layer temporal prediction using the spatial representation of the signal data,
the one or more intermediate layer HTMs being coupled to the one or more intermediate layers of the DNN and executable by the one or more computer processors to receive one or more intermediate layer spatial representations from the one or more intermediate layers of the DNN,
the one or more intermediate layer HTMs executable by the one or more computer processors to generate one or more intermediate layer temporal predictions based on the one or more intermediate layer spatial representations,
the recognition layer HTM being coupled to the recognition layer of the DNN and executable by the one or more computer processors to receive a recognition layer spatial representation from the recognition layer of the DNN,
the recognition layer HTM executable by the one or more computer processors to generate a recognition layer temporal prediction based on the recognition layer spatial representation, and
the recognition layer HTM executable by the one or more computer processors to generate an anticipation of a future outcome by recognizing a temporal pattern based on the input layer temporal prediction, the one or more intermediate layer temporal predictions, and the recognition layer temporal prediction.

17. A computer system comprising:
one or more computer processors; and
one or more non-transitory memories storing instructions that, when executed by the one or more computer processors, cause the computer system to perform operations comprising:
receiving signal data from one or more sensors, the one or more computing devices being electronically communicatively coupled to the one or more sensors to receive the signal data,
inputting the signal data into an input layer of a deep neural network (DNN), the DNN including one or more layers,
generating, using the one or more layers of the DNN, one or more spatial representations of the signal data,
generating, using one or more hierarchical temporal memories (HTMs) respectively associated with the one or more layers of the DNNs, one or more temporal predictions by the DNN based on the one or more spatial representations, and
generating an anticipation of a future outcome by recognizing a temporal pattern based on the one or more temporal predictions.

18. The system of claim 17, wherein recognizing the temporal pattern includes fusing the one or more temporal predictions.

19. The system of claim 17, wherein
the DNN includes a plurality of hierarchical layers including an input layer and one or more intermediate layers,
the input layer is coupled to an input layer HTM;
the one or more intermediate layers are coupled to one or more intermediate layer HTMs,
generating the one or more spatial representations of the signal data and generating the one or more temporal predictions based on the one or more spatial representations further include
generating, by the input layer of the DNN, a first spatial representation of the signal data,
passing the first spatial representation to the input layer HTM,
generating, by the input layer HTM, a first temporal prediction using the first spatial representation of the signal data,
receiving, by the one or more intermediate layers of the DNN, the first temporal prediction and the first spatial representation of the signal data, and
generating, by the one or more intermediate layers of the DNN, one or more intermediate spatial representations of the signal data,
generating, by the one or more intermediate layer HTMs, one or more intermediate temporal predictions based on the one or more intermediate spatial representations of the signal data, and recognizing the temporal pattern includes fusing the first temporal prediction and the one or more intermediate temporal predictions.

20. The system of claim 19, wherein the one or more intermediate layers of the DNN are hidden layers.

21. The system of claim 19, wherein
the DNN includes a recognition layer coupled to a recognition layer HTM, and
fusing the first temporal prediction and the one or more intermediate temporal predictions includes
fusing, at each HTM of the one or more intermediate layer HTMs and at the recognition layer, a current temporal prediction generated by the HTM and one or more prior temporal predictions generated by one or more prior intermediate layer HTMs and the input layer HTM.

22. The system of claim 19, wherein
receiving, at the one or more computing devices, the signal data from the one or more sensors includes receiving, at the one or more computing devices, two or more sets of signal data from two or more sets of sensors, respectively,
the DNN includes two or more input layers, the two or more input layers being associated with two or more input layer HTMs, respectively,
the one or more intermediate layers include two or more first intermediate layers associated with the two or more input layers, respectively, and a second intermediate layer after the two or more first intermediate layers,
the one or more intermediate layer HTMs include two or more intermediate layer HTMs coupled to the two or more first intermediate layers of the DNN,
generating, by the input layer of the DNN, a first spatial representation of the signal data includes generating, by the two or more input layers of the DNN, two or more first spatial representations of the signal data,
generating, by the input layer HTM, a first temporal prediction using the first spatial representation of the signal data includes generating, by the two or more input layer HTMs, two or more first temporal predictions,
generating, by the one or more intermediate layers of the DNN, one or more intermediate spatial representations of the signal data includes fusing the two or more first intermediate spatial representations,
generating, by the one or more intermediate layer HTMs, one or more intermediate temporal predictions based on the one or more intermediate spatial representations of the signal data includes fusing the two or more first temporal predictions, and
recognizing the temporal pattern includes fusing a present temporal prediction with the fused two or more first temporal predictions.

23. The system of claim 17, wherein generating, using the one or more layers of the DNN, the one or more spatial representations of the signal data includes performing, by a successive layer of the DNN, a nonlinear transformation of each spatial representation generated by one or more prior layers of the DNN.

24. The system of claim 17, further comprising:
recognizing a spatial pattern correlated with a present outcome based on the one or more spatial representations.

25. The system of claim 24, wherein the present outcome is a present human user action.

26. The system of claim 24, wherein the signal data includes data describing characteristics of a vehicle in motion at a present time.

27. The system of claim 17, wherein the future outcome is a predicted future human user action.

28. The system of claim 17, further comprising:
computing, at a future time, an HTM prediction error for using 1) the one or more temporal predictions; and 2) one or more spatial representations of sensor data received at the future time; and
training the HTM based on the HTM prediction error.

29. The system of claim 17, further comprising:
computing, at a future time, an DNN prediction error for a recognition layer of the DNN using 1) the anticipation; and 2) a recognized spatial pattern recognized by the recognition layer of the DNN based on the one or more spatial representations of sensor data received at a future time; and
training the DNN based on the DNN prediction error.

30. The system of claim 17, wherein the signal data includes one or more of image data, audio data, vehicle data from a Controlled Area Network (CAN) of the vehicle, electronic messaging data, and navigation data associated with a moving platform.

31. The system of claim 17, further comprising:
generating and providing one or more of an auditory instruction, a visual instruction, and a tactile instruction to the user via one or more output devices of a vehicle based on the anticipation of the outcome.

* * * * *